United States Patent
Boykin et al.

(10) Patent No.: US 10,789,840 B2
(45) Date of Patent: Sep. 29, 2020

(54) SYSTEMS, APPARATUSES AND METHODS FOR DETECTING DRIVING BEHAVIOR AND TRIGGERING ACTIONS BASED ON DETECTED DRIVING BEHAVIOR

(71) Applicant: COBAN Technologies, Inc., Houston, TX (US)

(72) Inventors: Terry W. Boykin, Katy, TX (US); Daniel P. Nooner, Richmond, TX (US)

(73) Assignee: COBAN Technologies, Inc., Houston, TX (US)

( * ) Notice: Subject to any disclaimer, the term of this patent is extended or adjusted under 35 U.S.C. 154(b) by 0 days.

(21) Appl. No.: 15/722,572

(22) Filed: Oct. 2, 2017

(65) Prior Publication Data

US 2018/0025636 A1    Jan. 25, 2018

Related U.S. Application Data

(63) Continuation-in-part of application No. 15/413,205, filed on Jan. 23, 2017.
(Continued)

(51) Int. Cl.
*G11B 3/00* (2006.01)
*G08G 1/0967* (2006.01)
(Continued)

(52) U.S. Cl.
CPC ....... *G08G 1/096725* (2013.01); *B60W 40/09* (2013.01); *B60W 40/105* (2013.01); *B60W 50/14* (2013.01); *G01S 19/42* (2013.01); *G06K 9/00335* (2013.01); *G06K 9/00818* (2013.01); *G06K 9/00825* (2013.01); *G06K 9/6202* (2013.01); *G07C 5/008* (2013.01); *G08B 13/19613* (2013.01); *G08B 13/19621* (2013.01); *G08B 13/19641* (2013.01);
(Continued)

(58) Field of Classification Search
CPC ........................ B60Q 1/2611; G08G 1/096725
See application file for complete search history.

(56) References Cited

U.S. PATENT DOCUMENTS 4,344,184 A    8/1982 Edwards
4,543,665 A    9/1985 Sotelo et al.
(Continued)

FOREIGN PATENT DOCUMENTS

CN       2907145       5/2007
CN    101309088 A    11/2008
(Continued)

OTHER PUBLICATIONS

"IEEE 802.1X," Wikipedia, Aug. 23, 2013, 8 pages, available at: http://en.wikipedia.org/w/index.php?title=IEEE_802.1X&oldid=569887090.
(Continued)

*Primary Examiner* — Jess Whittington
(74) *Attorney, Agent, or Firm* — Michael D. Lazzara; Leech Tishman Fuscaldo & Lampl

(57) ABSTRACT

Systems, apparatuses and methods for detecting the presence of certain driving behavior are disclosed. Driving behavior is detected by capturing and characterizing image data and sampling vehicle telemetry data. Real-time characterization techniques include object and shape recognition analytics to detect specifically designated content in captured image data. Actions are triggered based upon such detection.

21 Claims, 16 Drawing Sheets

Related U.S. Application Data

(60) Provisional application No. 62/333,818, filed on May 9, 2016.

(51) Int. Cl.

| | |
|---|---|
| *G07C 5/00* | (2006.01) |
| *B60W 50/14* | (2020.01) |
| *B60W 40/09* | (2012.01) |
| *B60W 40/105* | (2012.01) |
| *H04N 7/18* | (2006.01) |
| *G08G 1/01* | (2006.01) |
| *G01S 19/42* | (2010.01) |
| *G06K 9/00* | (2006.01) |
| *G06K 9/62* | (2006.01) |
| *H04N 1/21* | (2006.01) |
| *G08G 1/052* | (2006.01) |
| *H04N 21/81* | (2011.01) |
| *H04N 21/414* | (2011.01) |
| *H04N 21/84* | (2011.01) |
| *H04N 21/2368* | (2011.01) |
| *H04N 21/439* | (2011.01) |
| *H04N 21/2743* | (2011.01) |
| *G08B 13/196* | (2006.01) |
| *H04N 21/435* | (2011.01) |
| *H04N 21/43* | (2011.01) |
| *H04R 3/00* | (2006.01) |
| *H04N 5/232* | (2006.01) |
| *G08B 25/08* | (2006.01) |
| *G11B 27/10* | (2006.01) |
| *H04R 1/40* | (2006.01) |

(52) U.S. Cl.
CPC ....... *G08B 13/19656* (2013.01); *G08B 25/08* (2013.01); *G08G 1/0112* (2013.01); *G08G 1/052* (2013.01); *G11B 27/102* (2013.01); *H04N 1/2112* (2013.01); *H04N 5/23203* (2013.01); *H04N 5/232941* (2018.08); *H04N 5/232945* (2018.08); *H04N 7/183* (2013.01); *H04N 21/2368* (2013.01); *H04N 21/2743* (2013.01); *H04N 21/41422* (2013.01); *H04N 21/4302* (2013.01); *H04N 21/435* (2013.01); *H04N 21/4394* (2013.01); *H04N 21/8106* (2013.01); *H04N 21/84* (2013.01); *H04R 3/005* (2013.01); *H04R 1/406* (2013.01)

(56) References Cited

U.S. PATENT DOCUMENTS

| | | | |
|---|---|---|---|
| 4,590,614 A | 5/1986 | Erat | |
| 4,910,795 A | 3/1990 | McCowen et al. | |
| 5,012,335 A | 4/1991 | Cohodar | |
| 5,111,289 A | 5/1992 | Lucas et al. | |
| 5,408,330 A | 4/1995 | Squicciarini et al. | |
| 5,477,397 A | 12/1995 | Naimpally et al. | |
| 5,613,032 A | 3/1997 | Cruz et al. | |
| 5,724,475 A | 3/1998 | Kirsten | |
| 5,815,093 A | 9/1998 | Kikinis | |
| 5,841,978 A | 11/1998 | Rhoads | |
| 5,862,260 A | 1/1999 | Rhoads | |
| 5,926,218 A | 7/1999 | Smith | |
| 5,946,343 A | 8/1999 | Schotz et al. | |
| 5,970,098 A | 10/1999 | Herzberg | |
| 6,002,326 A | 12/1999 | Turner | |
| 6,009,229 A | 12/1999 | Kawamura | |
| 6,028,528 A | 2/2000 | Lorenzetti et al. | |
| 6,038,257 A | 3/2000 | Brusewitz et al. | |
| 6,122,403 A | 9/2000 | Rhoads | |
| 6,141,611 A | 10/2000 | Mackey et al. | |
| 6,163,338 A | 12/2000 | Johnson et al. | |
| 6,175,860 B1 | 1/2001 | Gaucher | |
| 6,181,711 B1 | 1/2001 | Zhang et al. | |
| 6,275,773 B1 | 8/2001 | Lemelson et al. | |
| 6,298,290 B1 | 10/2001 | Abe et al. | |
| 6,346,965 B1 | 2/2002 | Toh | |
| 6,405,112 B1* | 6/2002 | Rayner | B60R 1/00 340/426.28 |
| 6,411,874 B2 | 6/2002 | Morgan et al. | |
| 6,421,080 B1 | 7/2002 | Lambert | |
| 6,424,820 B1 | 7/2002 | Burdick et al. | |
| 6,462,778 B1 | 10/2002 | Abram et al. | |
| 6,505,160 B1 | 1/2003 | Levy et al. | |
| 6,510,177 B1 | 1/2003 | Bonet et al. | |
| 6,518,881 B2 | 2/2003 | Monroe | |
| 6,624,611 B2 | 9/2003 | Kirmuss | |
| 6,778,814 B2 | 8/2004 | Koike | |
| 6,788,338 B1 | 9/2004 | Dinev et al. | |
| 6,788,983 B2 | 9/2004 | Zheng | |
| 6,789,030 B1 | 9/2004 | Coyle et al. | |
| 6,791,922 B2 | 9/2004 | Suzuki | |
| 6,825,780 B2 | 11/2004 | Saunders et al. | |
| 6,831,556 B1 | 12/2004 | Boykin | |
| 7,010,328 B2 | 3/2006 | Kawasaki et al. | |
| 7,091,851 B2 | 8/2006 | Mason et al. | |
| 7,119,832 B2 | 10/2006 | Blanco et al. | |
| 7,120,477 B2 | 10/2006 | Huang | |
| 7,155,615 B1 | 12/2006 | Silvester | |
| 7,167,519 B2 | 1/2007 | Comaniciu et al. | |
| 7,190,882 B2 | 3/2007 | Gammenthaler | |
| 7,231,233 B2 | 6/2007 | Gosieski | |
| 7,272,179 B2 | 9/2007 | Siemens et al. | |
| 7,317,837 B2 | 1/2008 | Yatabe et al. | |
| 7,356,473 B2 | 4/2008 | Kates | |
| 7,386,219 B2 | 6/2008 | Ishige | |
| 7,410,371 B2 | 8/2008 | Shabtai et al. | |
| 7,414,587 B2 | 8/2008 | Stanton | |
| 7,428,314 B2 | 9/2008 | Henson | |
| 7,515,760 B2 | 4/2009 | Sai et al. | |
| 7,542,813 B2 | 6/2009 | Nam | |
| 7,551,894 B2 | 6/2009 | Gerber et al. | |
| 7,554,587 B2 | 6/2009 | Shizukuishi | |
| 7,618,260 B2 | 11/2009 | Daniel et al. | |
| 7,631,195 B1 | 12/2009 | Yu et al. | |
| 7,688,203 B2 | 3/2010 | Rockefeller et al. | |
| 7,693,289 B2 | 4/2010 | Stathem et al. | |
| 7,768,548 B2 | 8/2010 | Silvernail et al. | |
| 7,778,601 B2 | 8/2010 | Seshadri et al. | |
| 7,792,189 B2 | 9/2010 | Finizio et al. | |
| 7,818,078 B2 | 10/2010 | Iriarte | |
| 7,835,530 B2 | 11/2010 | Avigni | |
| 7,868,912 B2 | 1/2011 | Venetianer et al. | |
| 7,877,115 B2 | 1/2011 | Seshadri et al. | |
| 7,974,429 B2 | 7/2011 | Tsai | |
| 7,995,652 B2 | 8/2011 | Washington | |
| 8,068,023 B2 | 11/2011 | Dulin et al. | |
| 8,081,214 B2 | 12/2011 | Vanman et al. | |
| 8,086,277 B2 | 12/2011 | Ganley et al. | |
| 8,121,306 B2 | 2/2012 | Cilia et al. | |
| 8,126,276 B2 | 2/2012 | Bolle et al. | |
| 8,126,968 B2 | 2/2012 | Rodman et al. | |
| 8,139,796 B2 | 3/2012 | Nakashima et al. | |
| 8,144,892 B2 | 3/2012 | Shemesh et al. | |
| 8,145,134 B2 | 3/2012 | Henry et al. | |
| 8,150,089 B2 | 4/2012 | Segawa et al. | |
| 8,154,666 B2 | 4/2012 | Mody | |
| 8,166,220 B2 | 4/2012 | Ben-Yacov et al. | |
| 8,174,577 B2 | 5/2012 | Chou | |
| 8,195,145 B2 | 6/2012 | Angelhag | |
| 8,208,024 B2 | 6/2012 | Dischinger | |
| 8,228,364 B2 | 7/2012 | Cilia | |
| 8,230,149 B1 | 7/2012 | Long et al. | |
| 8,253,796 B2 | 8/2012 | Renkis | |
| 8,254,844 B2 | 8/2012 | Kuffner et al. | |
| 8,260,217 B2 | 9/2012 | Chang et al. | |
| 8,264,540 B2 | 9/2012 | Chang et al. | |
| 8,270,647 B2 | 9/2012 | Crawford et al. | |
| 8,289,370 B2 | 10/2012 | Civanlar et al. | |
| 8,300,863 B2 | 10/2012 | Knudsen et al. | |
| 8,311,549 B2 | 11/2012 | Chang et al. | |

(56) References Cited

U.S. PATENT DOCUMENTS

| | | | |
|---|---|---|---|
| 8,311,983 B2 | 11/2012 | Guzik | |
| 8,358,980 B2 | 1/2013 | Tajima et al. | |
| 8,380,131 B2 | 2/2013 | Chiang | |
| 8,422,944 B2 | 4/2013 | Flygh et al. | |
| 8,446,469 B2 | 5/2013 | Blanco et al. | |
| 8,457,827 B1* | 6/2013 | Ferguson | G05D 1/00 701/23 |
| 8,489,065 B2 | 7/2013 | Green et al. | |
| 8,489,151 B2 | 7/2013 | Engelen et al. | |
| 8,497,940 B2 | 7/2013 | Green et al. | |
| 8,554,145 B2 | 10/2013 | Fehr | |
| 8,612,708 B2 | 12/2013 | Drosch | |
| 8,630,908 B2 | 1/2014 | Forster | |
| 8,661,507 B1 | 2/2014 | Hesselink et al. | |
| 8,707,392 B2 | 4/2014 | Birtwhistle et al. | |
| 8,731,742 B2* | 5/2014 | Zagorski | G08G 1/166 701/3 |
| 8,780,199 B2 | 7/2014 | Mimar | |
| 8,781,292 B1 | 7/2014 | Ross et al. | |
| 8,849,557 B1* | 9/2014 | Levandowski | G08G 1/01 701/300 |
| 9,041,803 B2 | 5/2015 | Chen et al. | |
| 9,070,289 B2 | 6/2015 | Saund et al. | |
| 9,159,371 B2 | 10/2015 | Ross et al. | |
| 9,201,842 B2* | 12/2015 | Plante | G07C 5/008 |
| 9,225,527 B1 | 12/2015 | Chang | |
| 9,253,452 B2 | 2/2016 | Ross et al. | |
| 9,307,317 B2 | 4/2016 | Chang et al. | |
| 9,325,950 B2 | 4/2016 | Haler | |
| 9,471,059 B1 | 10/2016 | Wilkins | |
| 9,589,448 B1 | 3/2017 | Schneider et al. | |
| 9,665,094 B1 | 5/2017 | Russell | |
| 10,074,394 B2 | 9/2018 | Ross et al. | |
| 2002/0003571 A1* | 1/2002 | Schofield | B60C 23/00 348/148 |
| 2002/0051061 A1 | 5/2002 | Peters et al. | |
| 2002/0135679 A1 | 9/2002 | Scaman | |
| 2003/0052970 A1 | 3/2003 | Dodds et al. | |
| 2003/0080878 A1 | 5/2003 | Kirmuss | |
| 2003/0081122 A1 | 5/2003 | Kirmuss | |
| 2003/0081127 A1* | 5/2003 | Kirmuss | B60R 11/02 348/207.99 |
| 2003/0081128 A1 | 5/2003 | Kirmuss | |
| 2003/0081934 A1 | 5/2003 | Kirmuss | |
| 2003/0081935 A1 | 5/2003 | Kirmuss | |
| 2003/0095688 A1* | 5/2003 | Kirmuss | B60R 11/02 382/105 |
| 2003/0103140 A1 | 6/2003 | Watkins | |
| 2003/0151663 A1 | 8/2003 | Lorenzetti et al. | |
| 2003/0197629 A1 | 10/2003 | Saunders et al. | |
| 2004/0008255 A1 | 1/2004 | Lewellen | |
| 2004/0051793 A1 | 3/2004 | Tecu et al. | |
| 2004/0107030 A1* | 6/2004 | Nishira | B60W 40/02 701/36 |
| 2004/0146272 A1 | 7/2004 | Kessel et al. | |
| 2004/0177253 A1 | 9/2004 | Wu et al. | |
| 2005/0007458 A1 | 1/2005 | Benattou | |
| 2005/0078195 A1 | 4/2005 | VanWagner | |
| 2005/0083404 A1 | 4/2005 | Pierce et al. | |
| 2005/0088521 A1 | 4/2005 | Blanco et al. | |
| 2005/0122397 A1 | 6/2005 | Henson et al. | |
| 2005/0154907 A1 | 7/2005 | Han et al. | |
| 2005/0158031 A1 | 7/2005 | David | |
| 2005/0185936 A9 | 8/2005 | Lao et al. | |
| 2005/0243171 A1 | 11/2005 | Ross et al. | |
| 2005/0286476 A1 | 12/2005 | Crosswy et al. | |
| 2006/0072672 A1 | 4/2006 | Holcomb et al. | |
| 2006/0077256 A1 | 4/2006 | Silvemail et al. | |
| 2006/0078046 A1 | 4/2006 | Lu | |
| 2006/0130129 A1 | 6/2006 | Dai et al. | |
| 2006/0133476 A1 | 6/2006 | Page et al. | |
| 2006/0165386 A1 | 7/2006 | Garoutte | |
| 2006/0270465 A1 | 11/2006 | Lee et al. | |
| 2006/0274116 A1 | 12/2006 | Wu | |
| 2007/0005609 A1 | 1/2007 | Breed | |
| 2007/0064108 A1 | 3/2007 | Haler | |
| 2007/0086601 A1 | 4/2007 | Mitchler | |
| 2007/0111754 A1 | 5/2007 | Marshall et al. | |
| 2007/0124292 A1 | 5/2007 | Kirshenbaum et al. | |
| 2007/0217761 A1 | 9/2007 | Chen et al. | |
| 2007/0219685 A1* | 9/2007 | Plante | G07C 5/008 701/33.4 |
| 2008/0005472 A1 | 1/2008 | Khalidi et al. | |
| 2008/0030782 A1 | 2/2008 | Watanabe | |
| 2008/0129825 A1 | 6/2008 | DeAngelis et al. | |
| 2008/0165250 A1 | 7/2008 | Ekdahl et al. | |
| 2008/0186129 A1 | 8/2008 | Fitzgibbon | |
| 2008/0208755 A1 | 8/2008 | Malcolm | |
| 2008/0294315 A1* | 11/2008 | Breed | B60N 2/002 701/49 |
| 2008/0303903 A1 | 12/2008 | Bentley et al. | |
| 2009/0017881 A1 | 1/2009 | Madrigal | |
| 2009/0022362 A1 | 1/2009 | Gagvani et al. | |
| 2009/0074216 A1 | 3/2009 | Bradford et al. | |
| 2009/0076636 A1 | 3/2009 | Bradford et al. | |
| 2009/0118896 A1* | 5/2009 | Gustafsson | G05D 1/104 701/31.4 |
| 2009/0195651 A1 | 8/2009 | Leonard et al. | |
| 2009/0195655 A1 | 8/2009 | Pandey | |
| 2009/0213902 A1 | 8/2009 | Jeng | |
| 2010/0026809 A1 | 2/2010 | Curry | |
| 2010/0030929 A1 | 2/2010 | Ben-Yacov et al. | |
| 2010/0057444 A1 | 3/2010 | Cilia | |
| 2010/0081466 A1 | 4/2010 | Mao | |
| 2010/0131748 A1 | 5/2010 | Lin | |
| 2010/0136944 A1* | 6/2010 | Taylor | B60R 25/00 455/404.1 |
| 2010/0180051 A1 | 7/2010 | Harris | |
| 2010/0238009 A1* | 9/2010 | Cook | G06Q 10/06393 340/439 |
| 2010/0274816 A1 | 10/2010 | Guzik | |
| 2010/0287545 A1 | 11/2010 | Corbefin | |
| 2010/0289648 A1 | 11/2010 | Ree | |
| 2010/0302979 A1 | 12/2010 | Reunamäki | |
| 2010/0309971 A1 | 12/2010 | Vanman et al. | |
| 2011/0016256 A1 | 1/2011 | Hatada | |
| 2011/0044605 A1 | 2/2011 | Vanman et al. | |
| 2011/0092248 A1 | 4/2011 | Evanitsky | |
| 2011/0142156 A1 | 6/2011 | Haartsen | |
| 2011/0233078 A1 | 9/2011 | Monaco et al. | |
| 2011/0234379 A1 | 9/2011 | Lee | |
| 2011/0280143 A1 | 11/2011 | Li et al. | |
| 2011/0280413 A1 | 11/2011 | Wu et al. | |
| 2011/0299457 A1 | 12/2011 | Green et al. | |
| 2012/0014534 A1 | 1/2012 | Bodley et al. | |
| 2012/0028599 A1* | 2/2012 | Hatton | G08G 1/096775 455/404.2 |
| 2012/0078397 A1 | 3/2012 | Lee et al. | |
| 2012/0083960 A1* | 4/2012 | Zhu | G06T 7/223 701/23 |
| 2012/0119894 A1* | 5/2012 | Pandy | B60W 30/16 340/435 |
| 2012/0163309 A1 | 6/2012 | Ma et al. | |
| 2012/0173577 A1 | 7/2012 | Millar et al. | |
| 2012/0266251 A1 | 10/2012 | Birtwhistle et al. | |
| 2012/0300081 A1 | 11/2012 | Kim | |
| 2012/0307070 A1 | 12/2012 | Pierce | |
| 2012/0310394 A1 | 12/2012 | El-Hoiydi | |
| 2012/0310395 A1 | 12/2012 | El-Hoiydi | |
| 2013/0114849 A1 | 5/2013 | Pengelly et al. | |
| 2013/0135472 A1* | 5/2013 | Wu | G07C 5/0866 348/148 |
| 2013/0163822 A1 | 6/2013 | Chigos et al. | |
| 2013/0201884 A1 | 8/2013 | Freda et al. | |
| 2013/0218427 A1* | 8/2013 | Mukhopadhyay | B60W 40/09 701/51 |
| 2013/0223653 A1 | 8/2013 | Chang | |
| 2013/0236160 A1 | 9/2013 | Gentile et al. | |
| 2013/0242262 A1 | 9/2013 | Lewis | |
| 2013/0251173 A1 | 9/2013 | Ejima et al. | |
| 2013/0268357 A1 | 10/2013 | Heath | |
| 2013/0287261 A1 | 10/2013 | Lee et al. | |

(56) References Cited

U.S. PATENT DOCUMENTS

| | | | |
|---|---|---|---|
| 2013/0302758 A1* | 11/2013 | Wright | G07C 5/008 |
| | | | 434/65 |
| 2013/0339447 A1 | 12/2013 | Ervine | |
| 2013/0346660 A1 | 12/2013 | Kwidzinski et al. | |
| 2014/0037142 A1* | 2/2014 | Bhanu | G08G 1/015 |
| | | | 382/103 |
| 2014/0038668 A1 | 2/2014 | Vasavada et al. | |
| 2014/0078304 A1 | 3/2014 | Othmer | |
| 2014/0085475 A1* | 3/2014 | Bhanu | G06K 9/00825 |
| | | | 348/148 |
| 2014/0092251 A1 | 4/2014 | Troxel | |
| 2014/0100891 A1* | 4/2014 | Turner | G06Q 40/08 |
| | | | 705/4 |
| 2014/0114691 A1* | 4/2014 | Pearce | G06Q 40/08 |
| | | | 705/4 |
| 2014/0143545 A1 | 5/2014 | McKeeman et al. | |
| 2014/0162598 A1 | 6/2014 | Villa-Real | |
| 2014/0184796 A1 | 7/2014 | Klein et al. | |
| 2014/0236414 A1* | 8/2014 | Droz | G08G 1/166 |
| | | | 701/28 |
| 2014/0236472 A1* | 8/2014 | Rosario | G01C 21/3602 |
| | | | 701/400 |
| 2014/0278052 A1* | 9/2014 | Slavin | G01C 21/3492 |
| | | | 701/400 |
| 2014/0280584 A1 | 9/2014 | Ervine | |
| 2014/0281498 A1 | 9/2014 | Bransom et al. | |
| 2014/0297687 A1 | 10/2014 | Lin | |
| 2014/0309849 A1* | 10/2014 | Ricci | B60Q 1/00 |
| | | | 701/33.4 |
| 2014/0321702 A1 | 10/2014 | Schmalstieg | |
| 2014/0355951 A1 | 12/2014 | Tabak | |
| 2014/0375807 A1* | 12/2014 | Muetzel | H04N 7/18 |
| | | | 348/148 |
| 2015/0012825 A1 | 1/2015 | Rezvani et al. | |
| 2015/0032535 A1 | 1/2015 | Li et al. | |
| 2015/0066349 A1* | 3/2015 | Chan | G01C 21/3407 |
| | | | 701/400 |
| 2015/0084790 A1* | 3/2015 | Arpin | H04N 5/772 |
| | | | 340/936 |
| 2015/0086175 A1 | 3/2015 | Lorenzetti | |
| 2015/0088335 A1 | 3/2015 | Lambert et al. | |
| 2015/0103159 A1* | 4/2015 | Shashua | G06K 9/00798 |
| | | | 348/118 |
| 2015/0161483 A1 | 6/2015 | Allen et al. | |
| 2015/0211868 A1* | 7/2015 | Matsushita | G01C 21/32 |
| | | | 701/457 |
| 2015/0266575 A1 | 9/2015 | Borko | |
| 2015/0294174 A1* | 10/2015 | Karkowski | G06K 9/325 |
| | | | 382/182 |
| 2016/0023762 A1 | 1/2016 | Wang | |
| 2016/0035391 A1 | 2/2016 | Ross et al. | |
| 2016/0042767 A1 | 2/2016 | Araya et al. | |
| 2016/0062762 A1 | 3/2016 | Chen et al. | |
| 2016/0062992 A1 | 3/2016 | Chen et al. | |
| 2016/0063642 A1 | 3/2016 | Luciani et al. | |
| 2016/0064036 A1 | 3/2016 | Chen et al. | |
| 2016/0065908 A1 | 3/2016 | Chang et al. | |
| 2016/0144788 A1* | 5/2016 | Perrin, III | B60R 1/00 |
| | | | 348/148 |
| 2016/0148638 A1 | 5/2016 | Ross et al. | |
| 2016/0285492 A1 | 9/2016 | Vembar et al. | |
| 2016/0332747 A1* | 11/2016 | Bradlow | B64D 47/08 |
| 2017/0032673 A1* | 2/2017 | Scofield | G08G 1/0112 |
| 2017/0053169 A1 | 2/2017 | Cuban et al. | |
| 2017/0053674 A1 | 2/2017 | Fisher et al. | |
| 2017/0059265 A1 | 3/2017 | Winter et al. | |
| 2017/0066374 A1* | 3/2017 | Hoye | G08B 21/06 |
| 2017/0076396 A1* | 3/2017 | Sudak | G06Q 40/08 |
| 2017/0085829 A1 | 3/2017 | Waniguchi et al. | |
| 2017/0113664 A1* | 4/2017 | Nix | B60T 8/17558 |
| 2017/0178422 A1* | 6/2017 | Wright | G07C 5/008 |
| 2017/0178423 A1* | 6/2017 | Wright | G06Q 40/08 |
| 2017/0178678 A1* | 6/2017 | Ross | G11B 15/026 |
| 2017/0193828 A1 | 7/2017 | Holtzman et al. | |
| 2017/0253330 A1 | 9/2017 | Saigh et al. | |
| 2017/0324897 A1 | 11/2017 | Swaminathan et al. | |

FOREIGN PATENT DOCUMENTS

| | | |
|---|---|---|
| CN | 102355618 A | 2/2012 |
| CN | 102932703 A | 2/2013 |
| CN | 202957973 U | 5/2013 |
| CN | 103617005 A | 3/2014 |
| EP | 1148726 A2 | 10/2001 |
| EP | 1655855 A1 | 5/2006 |
| EP | 2107837 A1 | 10/2009 |
| GB | 2391687 A | 11/2004 |
| JP | 2003150450 A | 5/2003 |
| JP | 2005266934 A | 9/2005 |
| JP | 2009169922 A | 7/2009 |
| JP | 2012058832 A | 3/2012 |
| WO | 1997038526 A1 | 10/1997 |
| WO | 2000013410 A1 | 3/2000 |
| WO | 2000021258 A1 | 4/2000 |
| WO | 2000045587 A2 | 8/2000 |
| WO | 2000072186 A2 | 11/2000 |
| WO | 2002061955 A2 | 8/2002 |
| WO | 2004066590 A2 | 8/2004 |
| WO | 2004111851 A1 | 12/2004 |
| WO | 2005053325 A2 | 6/2005 |
| WO | 2005054997 A2 | 6/2005 |
| WO | 2007114988 A2 | 10/2007 |
| WO | 2009058611 A1 | 5/2009 |
| WO | 2009148374 A1 | 12/2009 |
| WO | 2012001143 A1 | 1/2012 |
| WO | 2012100114 A2 | 7/2012 |
| WO | 2012116123 A2 | 8/2012 |
| WO | 2013020588 A1 | 2/2013 |
| WO | 2013074947 A2 | 5/2013 |
| WO | 2013106740 A2 | 7/2013 |
| WO | 2013107516 A1 | 7/2013 |
| WO | 2013150326 A1 | 10/2013 |
| WO | 2014057496 A2 | 4/2014 |
| WO | 2016033523 A1 | 3/2016 |
| WO | 2016061516 A1 | 4/2016 |
| WO | 2016061525 A1 | 4/2016 |
| WO | 2016061533 A1 | 4/2016 |

OTHER PUBLICATIONS

"Near Field Communication," Wikipedia, Jul. 19, 2014, 8 pages, available at: https://en.wikipedia.org/w/index.php?title=near_field_communication&oldid=617538619.

"Portable Application," Wikipedia, Jun. 26, 2014, 4 pages, available at: http://en.wikipedia.org/w/index.php?title=Portable_application&oldid=614543759.

"Radio-Frequency Identification," Wikipedia, Oct. 18, 2013, 31 pages, available at: http://en.wikipedia.org/w/index.php?title=Radio-frequency_identification&oldid=577711262.

Bell-Northern Research L TO., "A Multi-Bid Rate Interframe Movement Compensated Multi mode Coder forVideo Conferencing" (Final Report prepared for DARPA), Apr. 1982, 92 pages, Ottawa, Ontario, Canada.

Chapter 5: "Main Memory," Introduction to Computer Science course, 2004, 20 pages, available at http://www2.cs.ucy.ac.cy/~nicolast/courses/lectures/MainMemory.pdf.

Gregory J. Allen, "The Feasibility of Implementing Video Teleconferencing Systems Aboard Afloat Naval Units" (Master's Thesis, Naval Postgraduate School, Monterey, California), Mar. 1990, 143 pages.

PCT International Search Report and Written Opinion issued in Application No. PCT/US07/63485 dated Feb. 8, 2008, 10 pages.

PCT International Search Report and Written Opinion issued in Application No. PCT/US15/47532 dated Jan. 8, 2016, 22 pages.

Sony Corporation, Digital Still Camera (MVC-CD200/CD300), Operation Manual, 2001, 108 pages, Sony, Japan.

Steve's Digicams, Kodak Professional DCS 620 Digital Camera, 1999, 11 pages, United States, available at: http://www.steves-digicams.com/dcs620.html.

(56) References Cited

OTHER PUBLICATIONS

Xiaoqing Zhu, Eric Setion, Bernd Girod, "Rate Allocation for Multi-Camera Surveillance Over an Ad HocNireless Network," 2004, 6 pages, available at http://msw3.stanford.edu/-zhuxq/papers/pcs2004.pdf.

* cited by examiner

SYSTEMS, APPARATUSES AND METHODS FOR DETECTING DRIVING BEHAVIOR AND TRIGGERING ACTIONS BASED ON DETECTED DRIVING BEHAVIOR

CROSS-REFERENCE TO RELATED APPLICATIONS

This application is a Continuation-in-Part of, and claims priority to, U.S. patent application Ser. No. 15/413,205, entitled "Systems, Apparatuses and Methods for Triggering Actions Based on Data Capture and Characterization," filed on Jan. 23, 2017, which in turn claims the benefit of U.S. Provisional Patent Application No. 62/333,818, entitled "Systems, Apparatuses and Methods for Creating, Identifying, Enhancing, and Distributing Evidentiary Data," filed on May 9, 2016. U.S. patent application Ser. No. 15/413,205 and U.S. Provisional Patent Application No. 62/333,818 are hereby incorporated herein by reference in their entirety.

STATEMENT REGARDING FEDERALLY SPONSORED RESEARCH

Not Applicable.

TECHNICAL FIELD OF THE INVENTION

This disclosure relates generally to systems and methods for collecting data related to a driver, analyzing the collected data to determine the driving behavior of a driver and triggering actions in response to driving behavior. More particularly, but not by way of limitation, this disclosure relates to using sensors and cameras to capture real-world image data, making determinations in real-time pertaining to the captured data, and triggering actions based upon such determinations.

BACKGROUND

Law enforcement officers ("LEOs") have a higher risk of injury or death than most other occupations. Among the more dangerous activities LEOs engage in involves driving. For example, According to the United States Bureau of Labor Statistics, 14% of all nonfatal injuries, and 41% of all fatal injuries to LEOs were caused by transportation incidents in 2014. See Bureau of Labor Statistics, https://www.bls.gov/iif/oshwc/cfoi/police-officers-2014-chart5-data.htm. Vehicle accidents involving LEOs can occur for the same reasons as other drivers such as distracted driving, speeding, reckless or aggressive driving, weather, running red lights and stop signs, fatigue, or carelessness.

Additionally, several causes of vehicle accidents are unique to the functions of LEOs, such as high-speed pursuits, or responding to emergencies. LEOs have various means of technology at their disposal to perform their tasks. However, while technology has provided law enforcement officers powerful tools to perform their jobs, it has also added a level of complexity for officers on patrol. There are many distractions competing for an officer's attention. "Workload" refers to the tasks which an LEO must perform in a short amount of time. For example, an LEO may be driving, observing driving behavior of others, listening to a dispatch radio, talking on the radio to other LEOs, reviewing a Be on Look Out ("BOLO") alert, and manipulating certain auxiliary vehicle controls such as a light bar or spotlight. LEOs frequently also have vehicle-mounted computers which they may view or be required to type upon.

High-speed pursuits introduce the highest risk for death or injury to LEOs, the suspect(s) and the public. High-speed pursuits present a unique and complicated set of risks which must be balanced against the objectives of the pursuit (e.g. suspect apprehension). Specifically, high-speed pursuits place the LEO, suspects, victims, bystanders, and the community at greater risk of harm of vehicle accidents. LEOs must process factors including, but not limited to, the LEO's own driving skills, traffic, weather, terrain, road conditions, proximity to other vehicles and bystanders, proximity of other LEOs available for backup, avenues for escape by the suspect, and the potential for apprehension (i.e. the officer must consider the likelihood of apprehension in the decision to continue a chase). The LEO must weight these factors to determine whether a suspect can be pursued without excessive risk. Many law enforcement agencies have guidelines, training and officer education intended to address these risks.

Many high-speed pursuits are initiated in response to routine traffic stops. For example, an LEO may observe a minor traffic offense such as running a red light. When the LEO turns on the police car's emergency lights or siren to signal to the suspect to pull over, the suspect may flee. Alternatively, the suspect may initially pull over and wait for the officer to exit his or her vehicle before fleeing. In either case, the LEO is frequently unaware of the suspect's identity or the level of risk the suspect poses to the public. For example, a suspect wanted for a violent crime may present a greater risk to the public if he is not apprehended. In such a case, the interests of law enforcement (i.e. suspect apprehension) might militate in favor of pursing the suspect. Where the suspect is not suspected of prior criminal conduct, and the suspect cannot be pursued safely, some law enforcement policies may advise the pursing LEO to "give up" with the hope that the suspect will cease driving recklessly once he or she recognizes the pursuit has terminated. Many law enforcement agencies have guidelines, training and officer education intended to address these risks and provide guidance when, or if, an LEO should cease a pursuit.

High-speed pursuits are times of intense workload for an LEO. Furthermore, during a pursuit, a person's stress response (i.e. fight-or-flight response) causes the adrenal gland to release adrenaline, dilate the pupils and constrict blood vessels. This physiological change causes heightened focus on the fleeing suspect, but reduces the LEO's peripheral awareness of the environment around the LEO. This physiological condition is referred to as "tunnel vision." The dramatic increase in the LEO's workload simultaneously occurring with the LEO's tunnel vision can cause the LEO to overlook certain risk factors associated with a pursuit and result in excessive risk to the LEO or the public.

Therefore, systems, apparatuses, and methods are discussed to monitor an LEO's driving behavior, monitor the driving behavior of other drivers (including a suspect), and trigger various events based upon the behavior of each. Also discussed are systems, apparatuses, and methods of a tiered analysis of the LEO's driving behavior that considers the dichotomy between the interests of law enforcement and the interests of public safety and the safety of the LEO.

SUMMARY

In view of the aforementioned problems and trends, embodiments of the present invention provide systems and methods for detecting, monitoring, evaluating and triggering actions in response to the driving behavior of a driver and/or a third party.

According to an aspect of the invention, a system includes a vehicle, the vehicle including at least one camera device configured to capture image data, at least one sensor configured to capture vehicle telemetry data, and a microprocessor linked to the at least one camera device and the at least one sensor, wherein the microprocessor is configured with instructions to detect the occurrence of at least one designated event.

According to another aspect of the invention, a method includes capturing image data using a camera device mounted to a vehicle, sampling telemetry data from at least one sensor mounted to the vehicle, and detecting the occurrence of at least one designated event from the image data and/or the telemetry data.

According to another aspect of the invention, a method includes capturing image data using a camera device, wherein the camera device is mounted to a first vehicle; sampling telemetry data from at least one sensor, wherein the at least one sensor is mounted to the first vehicle; determining an applicable speed limit; determining a first speed of the first vehicle using at least one of (i) the image data captured by the camera mounted to the first vehicle, and (ii) the telemetry data sampled from the at least one sensor mounted on the first vehicle; calculating a relative speed of a second vehicle to the first vehicle using the image data captured by the camera device mounted to the first vehicle; calculating a second speed of the second vehicle by adding together (i) the relative speed of the second vehicle to the first vehicle and (ii) the first speed of the first vehicle; and comparing the second speed of the second vehicle with the applicable speed limit.

According to another aspect of the invention, a system includes a first vehicle, the first vehicle including at least one camera device configured to capture image data, at least one sensor configured to capture vehicle telemetry data, and a microprocessor linked to the at least one camera device and the at least one sensor, wherein the microprocessor is configured with instructions to: determine an applicable speed limit; determine a first speed of the first vehicle using at least one of (i) image data captured by the camera device, and (ii) vehicle telemetry data captured by the at least one sensor; calculate a relative speed of a second vehicle to the first vehicle using the image data captured by the camera device; calculate a second speed of the second vehicle by adding together (i) the relative speed of the second vehicle to the first vehicle and (ii) the first speed of the first vehicle; and compare the second speed of the second vehicle with the applicable speed limit.

Other aspects of the embodiments described herein will become apparent from the following description and the accompanying drawings, illustrating the principles of the embodiments by way of example only.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

NOTATION AND NOMENCLATURE

Figure 1:
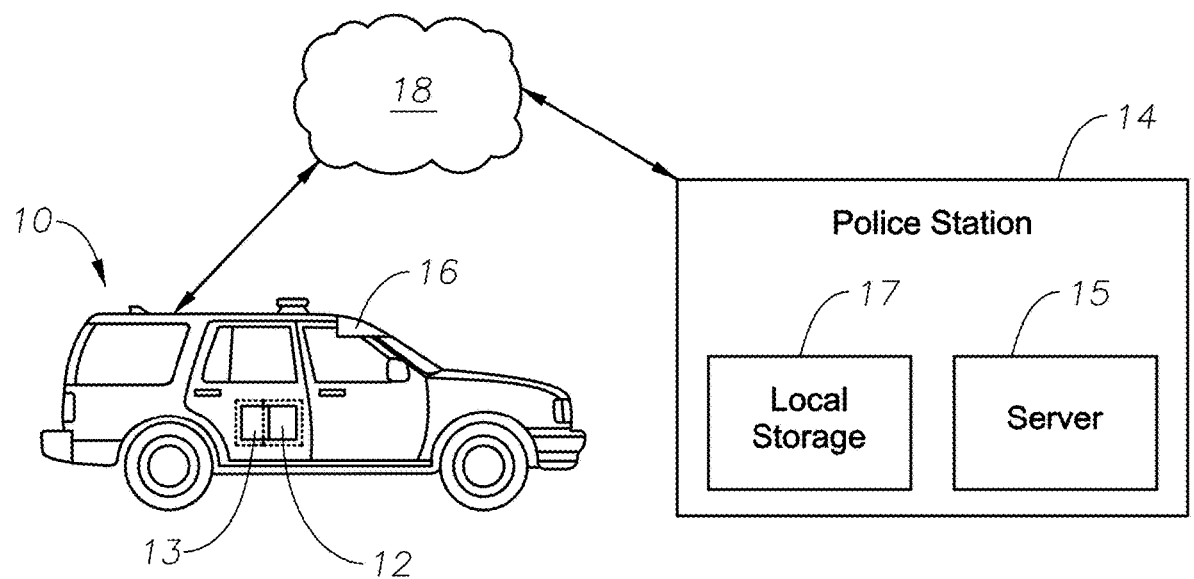
FIG. 1, in accordance with some embodiments of the present disclosure, depicts a communication scheme and data flow/exchange, specifically between a police vehicle with an onboard camera device and a police station.

Certain terms are used throughout the following description and claims to refer to particular system components and configurations. As one skilled in the art will appreciate, the same component may be referred to by different names. This document does not intend to distinguish between components that differ in name but not function. In the following discussion and in the claims, the terms "including" (and the like) and "comprising" (and the like) are used in an open-ended fashion, and thus should be interpreted to mean "including, but not limited to . . . ." Also, the term "couple," "coupled," or "linked" is intended to mean either an indirect or direct electrical, mechanical, or wireless connection. Thus, if a first device couples to or is linked to a second device, that connection may be through a direct electrical, mechanical, or wireless connection, or through an indirect electrical, mechanical, or wireless connection via other devices and connections.

As used throughout this disclosure the term "computer" encompasses special purpose microprocessor-based devices such as a digital video surveillance system primarily configured for executing a limited number of applications, and general purpose computers such as laptops, workstations, or servers which may be configured by a user to run any number of off the shelf or specially designed software applications. Computer systems and computer devices will generally interact in the same way with elements and aspects of disclosed embodiments. This disclosure also refers to memory or storage devices and storage drives interchangeably. In general, memory or a storage device/drive represents a medium accessible by a computer (via wired or wireless connection) to store data and computer program instructions. It will also be appreciated that use of the term "microprocessor" in this disclosure encompasses one or more processors.

The terms "video data" and "visual data" refer to still image data, moving image data, or both still and moving image data, as traditionally understood. Further, the terms "video data" and "visual data" refer to such image data alone, i.e., without audio data and without metadata. The term "image data" (in contrast to "still image data" and "moving image data") encompasses not only video or visual data but also audio data and/or metadata. That is, image data may include visual or video data, audio data, metadata, or any combination of these three. This image data may be compressed using industry standard compression technology (e.g., Motion Picture Expert Group (MPEG) standards, Audio Video Interleave (AVI), etc.) or another proprietary compression or storage format. The terms "camera," "camera device," and the like are understood to encompass devices configured to record or capture visual/video data or image data. Such devices may also be referred to as video recording devices, image capture devices, or the like. Metadata may be included in the files containing the video (or audio and video) data or in separate, associated data files, that may be configured in a structured text format such as eXtensible Markup Language (XML).

The term "metadata" refers to information associated with the recording of video (or audio and video) data, or information included in the recording of image data, and metadata may contain information describing attributes associated with one or more acts of actual recording of video data, audio and video data, or image data. That is, the metadata may describe who (e.g., Officer ID) or what (e.g., automatic trigger) initiated or performed the recording. The metadata may also describe where the recording was made. Metadata may also include telemetry or other types of data. For example, location may be obtained using global positioning system (GPS) information or other telemetry information. The metadata may also describe why the recording was made (e.g., event tag describing the nature of the subject matter recorded). The metadata may also describe when the recording was made, using timestamp information obtained in association with GPS information or from an internal clock, for example. Metadata may also include information relating to the device(s) used to capture or process information (e.g. a unit serial number). From these types of metadata, circumstances that prompted the recording may be inferred and may provide additional information about the recorded information. This metadata may include useful information to correlate recordings from multiple distinct recording systems as disclosed herein. This type of correlation information may assist in many different functions (e.g., query, data retention, chain of custody, and so on). The metadata may also include additional information as described herein, such as: location and size of an object of interest on screen, object's color and confidence level, vehicle make and confidence level, vehicle type and confidence level, license plate number/state (e.g., which of the 50 US states) and confidence level, and number of pedestrians. The terms "license plate number," "license plate character," and the like are all understood to encompass both numbers and other characters on a license plate.

The terms "cloud" and "cloud storage" are used interchangeably in this disclosure to describe that data is stored in an area generally accessible across a communication network (which may or may not be the Internet). A "cloud" may refer to a public cloud, private cloud, or combination of a public and private cloud (e.g., hybrid cloud). The term "public cloud" generally refers to a cloud storage area that is maintained by an unrelated third party but still has certain security measures in place to ensure that access is only allowed to authorized users. The term "private cloud" generally refers to a cloud storage area that is maintained by a related entity or that is maintained on physical computer resources that are separate from any unrelated users.

The term "global" refers to worldwide and the term "global access" refers to being available or accessible from anywhere in the world via conventional communication means (e.g. the communication network described herein).

The term "telemetry data" refers to the data sampled from sensors which measure the parameters of a vehicle or its system and components.

The term "vehicle dynamics" refers to how the performance of the vehicle is controlled to accelerate, brake, or steer the vehicle.

The term "aggressive driving" refers to the behavior of a driver which tends to endanger the driver, other persons, or property.

DETAILED DESCRIPTION

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness. The same or similar parts may be marked with the same or similar reference numerals.

While various embodiments are described herein, it should be appreciated that the present invention encompasses many inventive concepts that may be embodied in a wide variety of contexts. The following detailed description of exemplary embodiments, read in conjunction with the accompanying drawings, is merely illustrative and is not to be taken as limiting the scope of the invention, as it would be impossible or impractical to include all of the possible embodiments and contexts of the invention in this disclosure. Upon reading this disclosure, many alternative embodiments of the present invention will be apparent to persons of ordinary skill in the art. The scope of the invention is defined by the appended claims and equivalents thereof.

Illustrative embodiments of the invention are described below. In the interest of clarity, not all features of an actual implementation are necessarily described for each embodiment disclosed in this specification. In the development of any such actual embodiment, numerous implementation-specific decisions may need to be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure. It will also be appreciated that the parts and component dimensions of the embodiments disclosed herein may not be drawn to scale.

Although the content of this disclosure is presented largely in the context of law enforcement, it should be understood that this content is also applicable outside of that context. For example, this content is also applicable in the consumer and commercial context, e.g., detecting driver behavior with regard to consumer and commercial vehicles.

FIG. 1 depicts an embodiment of this disclosure. A police vehicle 10 is equipped with a computer 12 (which accordingly may be referred to as "vehicle 10 computer 12") linked to a server 15 housed in a police station 14 via a communication network 18 (e.g., Internet, Cloud, radio network, Bluetooth, Wi-Fi, 3G, 4G, LTE, satellite, etc.). The computer 12 is linked with a communications module that includes a (e.g., mobile) receiver 13. The police vehicle 10 may be a car, motorcycle, bicycle, aircraft, watercraft, or other transportation means. The police station 14 may also house a memory storage bank 17 in addition to server 15 for data processing and communications. The vehicle 10 is equipped with one or more camera devices 16 to capture image data from the real world. The camera device(s) 16 may or may not be mobile. The camera device 16 may also be configured with internal memory (e.g. hard disk) and/or coupled to a local or remote storage drive for recordation (in digital or analog format) of the collected information. Suitable camera devices 16 that may be used to implement embodiments of this disclosure include the devices commercially available from COBAN Technologies Inc., in Houston, Tex. (http//www.cobantech.com).

The vehicle 10 computer 12 is configured to access one or more databases (onboard the vehicle 10 or remote via the communication network 18) containing a repository with detailed information and data of existing vehicles, structures, objects, people, etc.). For example, an accessible database may be populated with data regarding parameters, shapes, other information relating to particular individuals, states and cities, vehicle identification parameters/characteristics (makes, models, colors, etc.), weapons data, etc. The database(s) can be updated as often as necessary. It will be appreciated that for law enforcement applications, the computer 12 may have access to databases and data repositories that are not available to the general public. In some embodiments, the police station 14 memory storage bank 17 houses the database accessed by the vehicle 10 computer 12.

In addition to receiving regular communications via the receiver 13, the vehicle computer 12 microprocessor is configured with specific instructions to be carried out upon receipt of certain communications, such as Amber alerts, Silver alerts, etc., (via the communication network 18) from the police station 14 or other designated agencies or systems, such as the FBI, DEA, ATF, etc. For example, law enforcement agencies often issue Be on Look Out ("BOLO") alerts to bring to the attention of law enforcement officers key information regarding an occurrence or activity of high importance. Such alerts typically include a description with some known details and facts relating to a suspect or an item or event of interest. The officer who receives the BOLO alert is intended to keep an eye out for the suspect or item of interest by continually or periodically scanning his environment for the particular descriptive details of the suspect/item identified in the alert.

The present disclosure provides the officer the means to leverage technology to perform this continual monitoring task. Upon receipt of such alerts, the computer 12 microprocessor activates the camera device 16 (if not already activated) to start collecting information and processing the captured image data to determine whether the specific content identified in the alert is present in the captured image data. The computer 12 microprocessor is configured to search the captured image data for the presence of the designated content according to the received alert or communication. For example, the designated content may include information such as: a geographical parameter (e.g. GPS coordinate), location data (street designation, historic site, monument, etc.), vehicle type (SUV, truck, sedan, motorcycle, etc.), license plate number(s), particular objects (traffic lights, street signs, etc.), particular shapes (human, animal, etc.), or a person, e.g., with particular characteristics.

When an object enters the scene, the computer 12 microprocessor performs analytics on the captured image data using the accessed database(s), and the analytics include creating snapshots and character scanning, optical character recognition (OCR), pixel scanning, and shape/pattern recognition analytics to analyze and search the captured data for the presence of images matching the designated content. The analytics software may also analyze a scene, tracking identified objects of interest, for example, a police officer's movements. For example, if an officer falls and becomes horizontal for a certain amount of predetermined time, the microprocessor can send an alert to police dispatch through the communication network 18 so that dispatch can call via radio or cell phone to check on the fallen officer. If there is no response from the fallen officer in a predetermined amount of time, dispatch can send support to assist in case of a serious issue. The shape/pattern detection analytics may also be used to detect objects already in or coming into the scene, such as a person walking or running, and also to detect the direction of travel of such objects. It may also be used to detect objects or people approaching the officer based on changes in the detected measured distance between the officer and person/object, and based on this analysis, the microprocessor can send an alert to the officer on the scene (e.g., via radio, 3G/4G wireless networks, or Body Worn Camera (BWC) speaker over Wi-Fi or Bluetooth®). Additional features that may be provided by the analytics engine include automatically marking image data if a crash was detected in the background of the scene, such as a vehicle rolling or flipping. Yet another aspect of the shape/pattern detection features provided by the analytics engine is the determination of a weapon threat. The scene can be scanned for the detection of objects such as potential weapon types like guns, knives, etc., being held in a person's hand or for various threatening stances by a potential adversary such as detecting when the adversary is standing, squatting sideways, running, etc.

The detection/analytics capabilities of the disclosed embodiments also include the ability to scan the entire or specified area of a scene for any movement. For example, if an officer is parked somewhere filling out a report and looking down, if the system detects movement an alert sound or message on a display (e.g. the vehicle display) can notify the officer to be aware. With multiple viewing angles, the alerts can also notify the officer which direction the movement came from by using distinct sounds for each direction such as front, rear, right side or left side, voice notification of the direction and/or notification messages on the display. The system can also notify the officer if it is a vehicle, person, or an unknown object and if the object is moving fast or in a threatening manner. Such embodiments may incorporate the camera/microphone unit 16 described below with respect to FIGS. 6-8.

Figure 2:
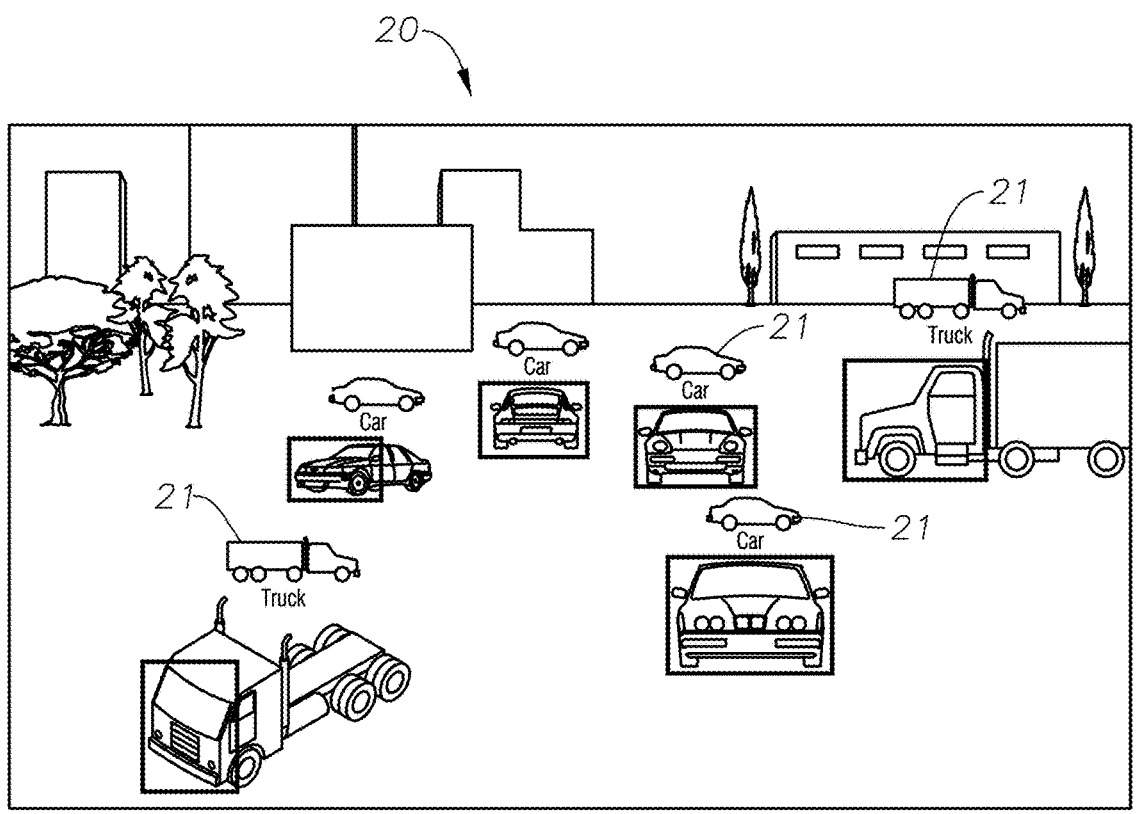
FIG. 2, in accordance with some embodiments of the present disclosure, depicts the recognition of a plurality of "vehicle" shapes in a video frame of visual data.
Figure 3:
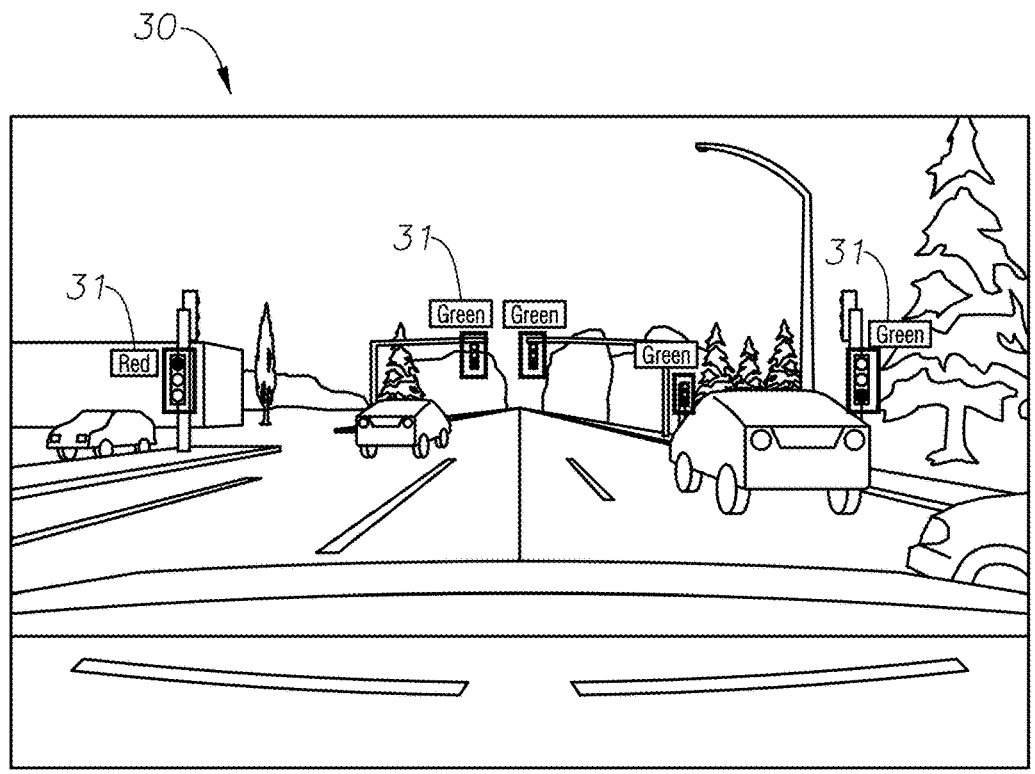
FIG. 3, in accordance with some embodiments of the present disclosure, depicts the recognition of various traffic signal shapes in a video frame of visual data.
Figure 4:
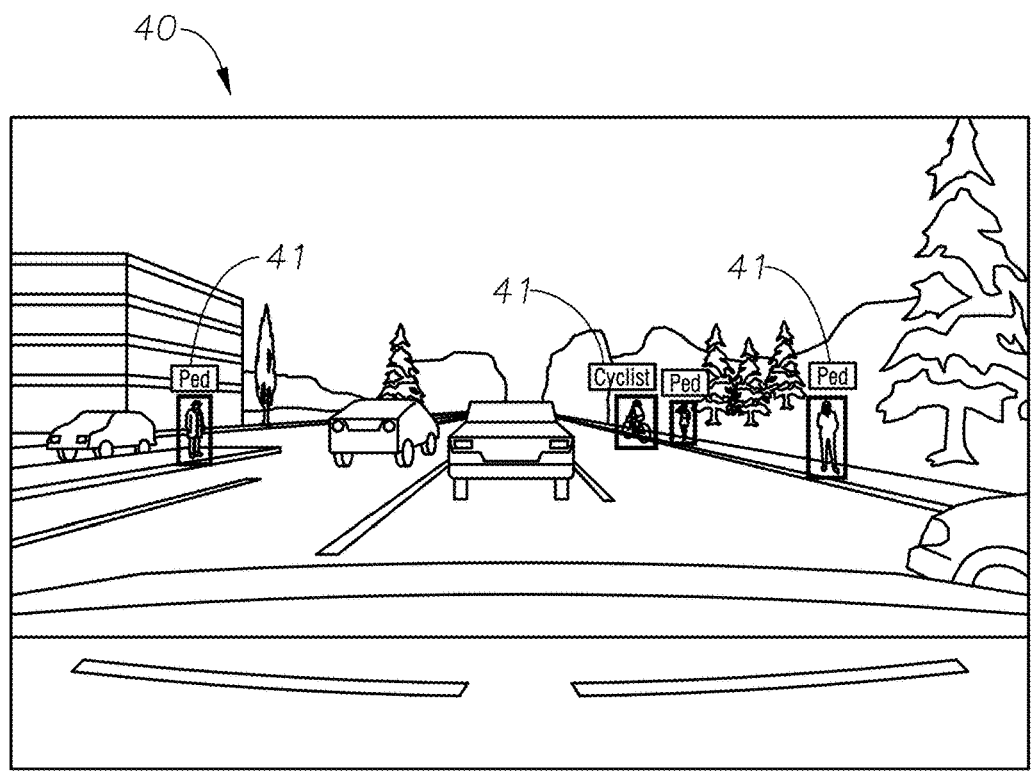
FIG. 4, in accordance with some embodiments of the present disclosure, depicts the recognition of a plurality of "people" shapes in a video frame of visual data.

FIGS. 2-4 depict scenes as processed by the computer 12 microprocessor to detect various shapes and objects according to embodiments of this disclosure. FIG. 2 depicts the recognition of multiple vehicle shapes (shown in and above bounding boxes) 21 in a video frame 20 of the information captured by a camera device 16. This data may be used, e.g., to detect a vehicle of interest. FIG. 3 depicts the recognition of various traffic signal shapes (shown in bounding boxes) 31 in a video frame 30 of the information captured by a camera device 16. The detection of such real-world features can be used to provide additional location data. FIG. 4 depicts the recognition of multiple "people" shapes (shown in bounding boxes) 41 in a video frame 40 of the information captured by a camera device 16. Such data may be used to implement the applications related to officer safety or behavior patterns as disclosed herein.

In some embodiments, once the analytics engine detects a match or near match of the designated content in the captured image data, the analytics engine proceeds to another step of further analyzing the data containing the designated content to detect for the presence of one or more designated details or attributes of or associated with the designated content. For example, a communication may be received by the receiver 13 (such as a BOLO, Amber, or Silver alert), designating the content to search for as a car, and the attributes as a silver Audi A6 sedan. In this case, the analytics engine will scan and search the captured image data for a match of the descriptor, i.e., the car. If the analytics engine detects the presence of a car in the captured image data, the data is then further analyzed to determine if the designated attributes (i.e., vehicle make —Audi, vehicle model—A6, color—silver, vehicle type—sedan) are present in the data. Other possible designated attributes that may be provided in a communication or alert include, for example: state identifiers (e.g., license plate numbers, characters, emblems, mottos, etc.). In some embodiments, the computer 12 microprocessor continually writes all metadata/attribute information associated with the detected designated content to a text or XML file. It will be appreciated that the designated content descriptors and associated designated attributes may comprise an unlimited variety of items and descriptors, as exist in the real world. The embodiments of this disclosure are not to be limited to any specific content or attribute of such content.

In some embodiments, the analysis further includes the determination of a confidence level or criterion for the designated attribute(s). Modern processors provide the ability for high-speed analysis of vast amounts of data. Physical dimensions and parameters of real-world objects represent factual data that can be mathematically measured, analyzed, and compared. For example, the length, width, and height of a vehicle of a given make and model represents factual data. In some embodiments, the analytics engine analysis of the collected data entails a breakdown of the captured images into data points or pixels that are then analyzed to determine respective spacing and dimensions, which can then be compared to the real-world parameters in the database library of existing items. For instance, continuing with the silver Audi A6 example, once the analytics engine detects a vehicle in the image data, it then performs further analysis to detect for the color silver based on a pixel hue analysis, it may then continue the analysis to mathematically define the dimensions of the detected vehicle for comparison against the actual Audi A6's dimension parameters stored in the database. If a match or near match is found between the dimensions of the detected car and one of the A6 models in the library, the engine then calculates a probability factor representing a confidence level for the match and compares that to a criterion for equivalence or matching of the detected object and the object stored in the database. If, for example, the criterion for equivalence has been set (e.g., by a user via the software) at 95% or greater for vehicle data matching parameters and the calculated probability factor equaled or exceeded 95%, the analytics engine would determine a positive result and proceed with triggering an action as described for the disclosed embodiments.

Different criteria for equivalence can be set for different items. For example, the criterion of equivalence for an affirmative match result for a license plate number may be set at 55% or better, to allow for instances when only a partial plate number is decipherable from the captured image. In the case of attributes for which there are no standard items (for comparison against the detected item for purposes of determining equivalence) stored in the database, the analytics engine can bypass this database query and perform a character-recognition analysis. However, for law enforcement applications, the database available to officers will likely contain all available information relating to data such as a license plate number. In some embodiments, the criterion of equivalence for an affirmative match result may be based on a probability factor from a combination of analyzed attributes.

In some embodiments, the analytics to determine a confidence level or criterion for the designated attribute(s) are based on a deep learning algorithm. The computer 12 may be configured with software providing a deep learning analytics engine. Defined shapes and movement rules, multiple images of vehicle types, make, model, etc., can be input and stored in the deep learning engine at different viewing angles, distances, various lighting conditions, etc. The captured image data can be compared against the engine contents to provide a data output with a percentage of confidence of accuracy for its attributes to trigger an action as described herein. The analytics and rules can be applied to any object (e.g., pedestrians, animals, street signs, etc.).

In some embodiments, the analytics for recognition and detection of the designated content is distributed among the vehicle 10 computer 12 and one or more remote computers (e.g. the server 15 in the police station 14). In such embodiments, the server 15 may be configured to generate a neural net object model for the vehicle 10 computer 12. The vehicle 10 computer 12 can also be configured to use a separate neural network to instantly achieve multiple object recognition as described herein. The vehicle 10 computer 12 and the remote computer(s) can communicate and exchange data via the communication network 18. In yet other embodiments, the vehicle 10 computer 12 and/or the remote computer(s) (e.g. server 15) may be configured with artificial intelligence (AI) software providing the system the ability to learn, to further increase the accuracy of object recognition. In some embodiments, the analytics engine is configured to detect unknown objects (e.g. a modified vehicle). This data can be locally stored for later upload or immediately transmitted to another location (e.g. to server 15) for verification and/or classification to aid in the training of detection of objects by the detection engine. With AI implementations, this type of classification can be done in or near real-time on the edge device such as an in-car video unit or a wearable device such as a body worn camera. In this description, an "edge" device generally refers to a device used or located at a point of interest. Thus, for the disclosed embodiments, an edge device is considered an on-scene device. It will be appreciated by those skilled in the art that embodiments of this disclosure may be implemented using conventional software platforms and coding configured to perform the techniques as disclosed herein.

Once the analytics engine determines that the designated attribute(s) is/are present in the captured image data, the microprocessor triggers an action. The triggered action may include:

(i) Providing an alert—The officer may be given a visual and/or audible alert on his vehicle display that a positive match has been detected. An alert may also be sent via the communication network to the police station or other locations. Alert notifications and/or images and metadata may also be sent to any other vehicle or officer that may be nearby or heading in the general direction of the detected object of interest.

(ii) Displaying an image—A video or still image of the detected content may be displayed on the vehicle display. A snapshot (such as video frame 20, 30 or 40) can be displayed, highlighting or putting a bounding box (such as 21, 31, or 41) around the object detected, and its movements can be tracked on the display in real-time or after the fact. Captured image data may also be transmitted via the communication network for viewing on a smart phone, tablet, PC, or the like (e.g., of another officer in another location in the field or at a remote location, e.g., at central headquarters).

(iii) Activating data recording—An onboard storage device may start saving the information being captured by the camera device. Other camera devices in the vehicle can be triggered to start recording. The captured information may also be transmitted concurrently via the communication network to be stored at the police station or another location. The triggered action may also include the activation of other camera devices worn by officers or within other law enforcement vehicles within a set perimeter of the detected item of interest.

(iv) Communicating information relating to the detected content—The captured information (e.g., data files and/or associated metadata files) may be transmitted via the communication network to the police station or other locations (e.g., other police officers in the area). Information such as location (latitude/longitude), direction of travel (e.g., of a vehicle of interest), speed and time of the scan, a snapshot, shape detection attributes, etc., can be transmitted to police dispatch or other remote location. For example, associated metadata and/or a snapshot can be transmitted to a remote location or to any or all other computer devices or members/users in the group or to a dispatch/command center.

(v) Activating a hardware function—In addition to or instead of the activation of data recording (iii, above), equipment or systems may be activated depending on the detected content (e.g., automatic activation of the vehicle's light bar if a crash scene is detected). Live video/audio streaming may also be activated.

(vi) Activating a software function—A voice-to-text program may be activated to produce a text file of audio captured in association with the captured video. A voice keyword-based program may be activated to trigger other actions (e.g., if a key word is detected such as "gun", "shots fired", or "kill", video can be marked and sent with an alert to the police station or other location or device to inform other officers).

(vii) Extracting and storing content of the obtained information—Other law enforcement agencies or designated systems may be granted access, via the communication network, to download and store the information captured by the camera device.

(viii) Production of a text file—In some embodiments, audio captured in association with the captured video by a mobile audio recorder in the vehicle or worn by the officer can be converted to text (in real-time or from recorded data). The conversion process can output a separate text file for viewing on the vehicle display, and may also transmit the data via the communication network for viewing on a smart phone, tablet, PC, or at a remote location. One use of the text file can be for performing a keyword search during an active or previously recorded event. In some embodiments where video and metadata is continually recorded, all objects or specifically defined objects can be scanned and the metadata associated with the detected objects of interest can be written to a text/xml file or other small database. Metadata captured in the image data or associated with the video data may also be scanned separately, in real-time or from prerecorded metadata. In some embodiments, the vehicle 10 computer 12 may also be configured to mark start and end points in the captured image data associated with scanned metadata. In other embodiments, the vehicle 10 computer 12 may also be configured to isolate images or produce snapshots or video clips associated with scanned metadata. All of this data can be stored locally for a predetermined time or on a FIFO basis; it can also be uploaded to a remote location continually or in configurable intervals and packet sizes. This data can also be stored on a remote server (as described below with reference to a Global Data Access System).

Figure 5:
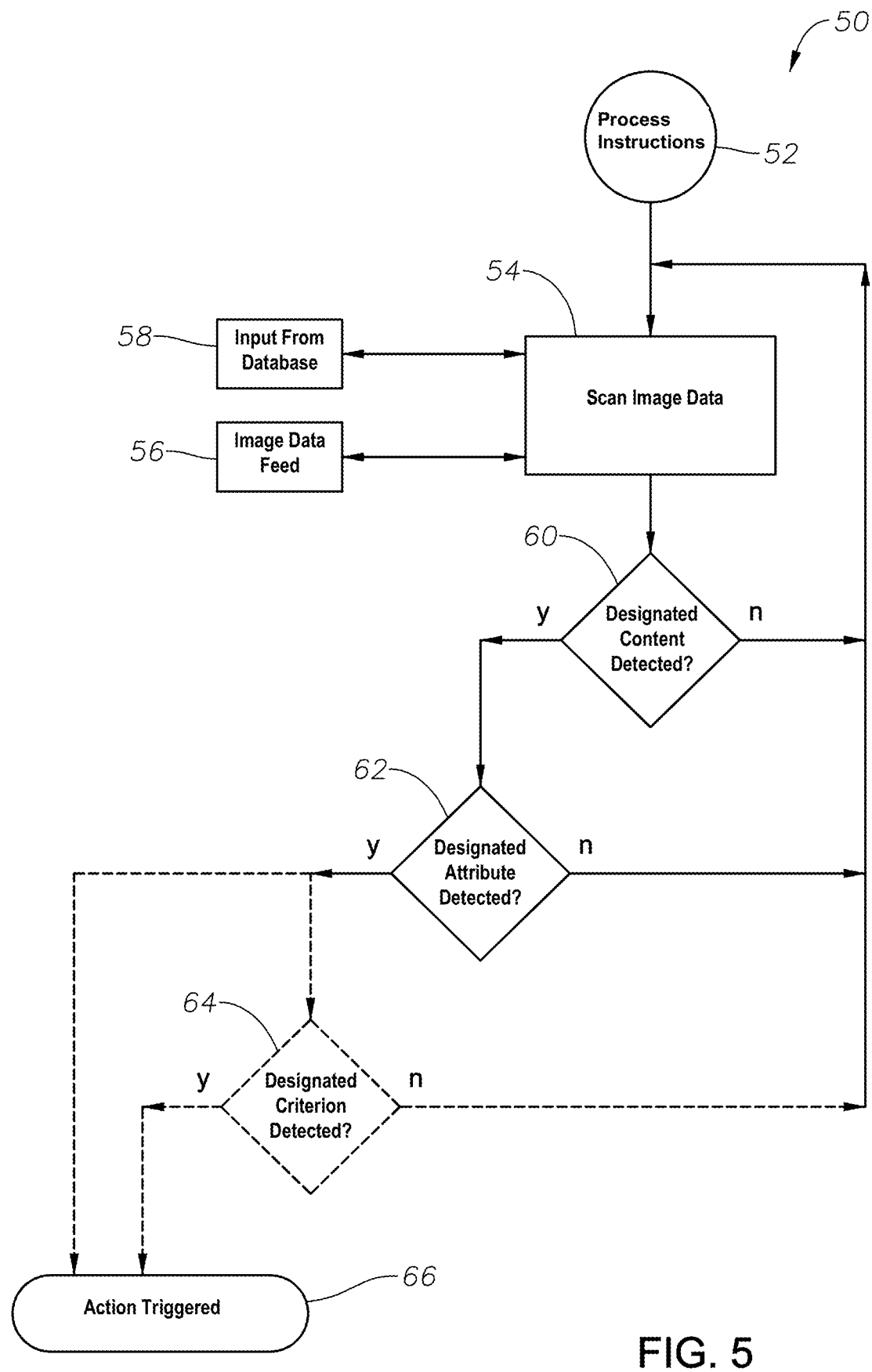
FIG. 5, in accordance with some embodiments of the present disclosure, depicts a processing flow chart for an analytics engine.

FIG. 5 depicts a processing flow chart for an analytics engine 50 embodiment in accordance with this disclosure. As described above, the receiver 13 in the vehicle 10 receives the communication indicating the designated content to search for, along with the known attribute(s) associated with the designated content. At module 52, the vehicle computer 12 processes the instructions and the microprocessor commences the scanning analysis. At module 54, the analysis entails a data feed 56 of the image data from the linked camera device(s) 16 to the computer 12 microprocessor. The data feed 56 from the camera device(s) 16 to the computer 12 may be wireless or via cabling (e.g. using a wired onboard vehicle camera). In some embodiments, the computer 12 may be configured to automatically activate the linked mobile camera device(s) 16 to start collecting image data, if the device(s) is/are not already activated. Module 54 also comprises linking with a database 58 to perform the analysis of the collected image data. As previously described, the database 58 may be resident in the vehicle 10 computer 12 or remotely located (e.g. the police station 14 memory storage bank 17) and accessed via the communication network 18. At module 60, the analysis continues with a scan of the image data captured by the camera device(s) 16 to detect for the presence of the designated content. If the designated content is not detected in the captured image data, module 60 entails a return to module 54 and the analysis continues with the scanning of additional image data collected by the camera device(s) 16. If the designated content is detected, the flow proceeds with analysis at module 62, where the image data containing the detected designated content is further analyzed to determine if the data comprises the designated attribute(s) conveyed in the communication. If the designated attribute(s) is/are not detected, module 62 entails a return to module 54 and the analysis continues with the scanning of additional image data collected by the camera device(s). If the designated attribute(s) is/are detected, the flow proceeds directly to module 66, or in some embodiments to an additional (optional) module 64. If proceeding directly from module 62 to module 66, the computer 12 microprocessor triggers an action as previously described. With embodiments comprising optional module 64, the image data containing the detected designated attribute(s) is further analyzed to determine if the attribute(s) meets the designated criterion, as described above. If the attribute(s) meets the designated criterion, the flow proceeds to module 66 and an action is triggered. If the attribute(s) does not meet the designated criterion, module 64 entails a return to module 54 and the analysis continues with the scanning of additional image data collected by the camera device(s) 16. The computer 12 can process multiple searches relating to multiple incoming communications, performing the respective scanning/analysis on the captured image data. The collection and processing of image data may be stopped and started as desired by a user (e.g. an officer in the vehicle) entering a command (e.g., a voice command or a command that is typed/keyed/entered by touchpad) or pushing a button on the computer 12 or on a BWC 29, or by another incoming communication (e.g. from the alert dispatching source) instructing the computer 12 to cancel or start/resume the particular search/analysis. When an alert is cleared or cancelled, the computer 12 resumes scanning all available image data captured in the scene until another communication is received to trigger another action (e.g. another alert) or the officer manually enters a different instruction. The computer 12 may also be configured to automatically clear an alert after running a scan without a match for a predetermined time or when the vehicle 10 is housed or turned off (e.g. when a patrol car is parked at the police station at the end of a shift). It will be appreciated by those skilled in the art that embodiments of the analytics engine disclosed herein may be implemented using any suitable computer platforms and coding as known in the art.

A benefit of the functionality provided by the disclosed embodiments is that the camera device and detection/analytics engine may find an object or person of interest that a police officer didn't notice. For example, a police officer may be driving down the street when a BOLO is issued for the silver Audi sedan. The officer may be focusing on driving or performing some other activity/task and may not see the item of interest, in this case the disclosed systems can alert multiple officers to be aware of the potential object of interest and thereby improve the chances for detection. This can also increase safety and efficiency for the officer. Officer efficiency may also be improved with embodiments wherein the camera device and detection/analytics engine are configured to detect expired vehicle tags. Once the analytics engine makes such a determination, the microprocessor can trigger an action as described above (e.g., flash an alert on the vehicle display, issue a notice to the police station 14, record the information as metadata, etc.). Moreover, the disclosed embodiments provide the means to perform the described detection and analytics techniques in real-time, as image data is being captured.

Figure 6:
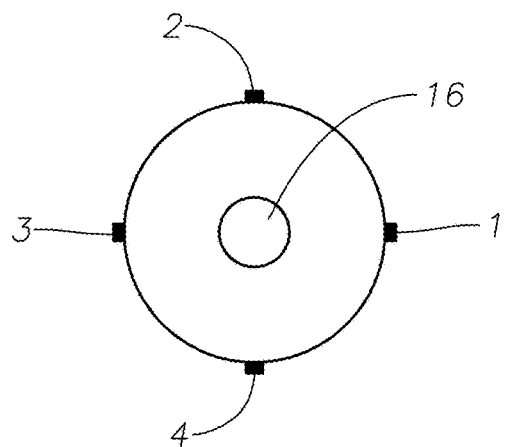
FIG. 6, in accordance with some embodiments of the present disclosure, depicts a top view of a device that may be installed on top of a police vehicle, featuring at least one 360-degree spherical camera.
Figure 7:
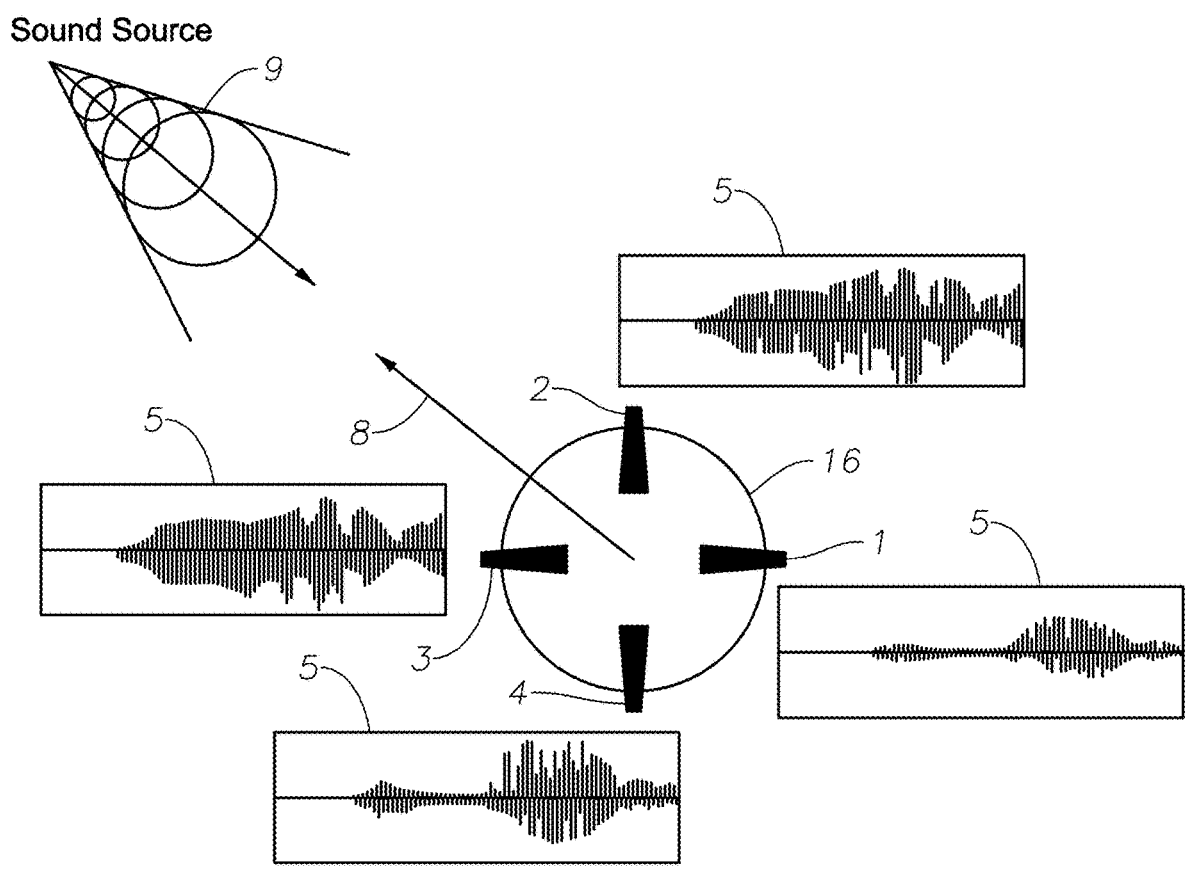
FIG. 7, in accordance with some embodiments of the present disclosure, depicts a bottom view of the device of FIG. 6, receiving sound data, and various pictorial depictions of sound data that may be collected.
Figure 8:
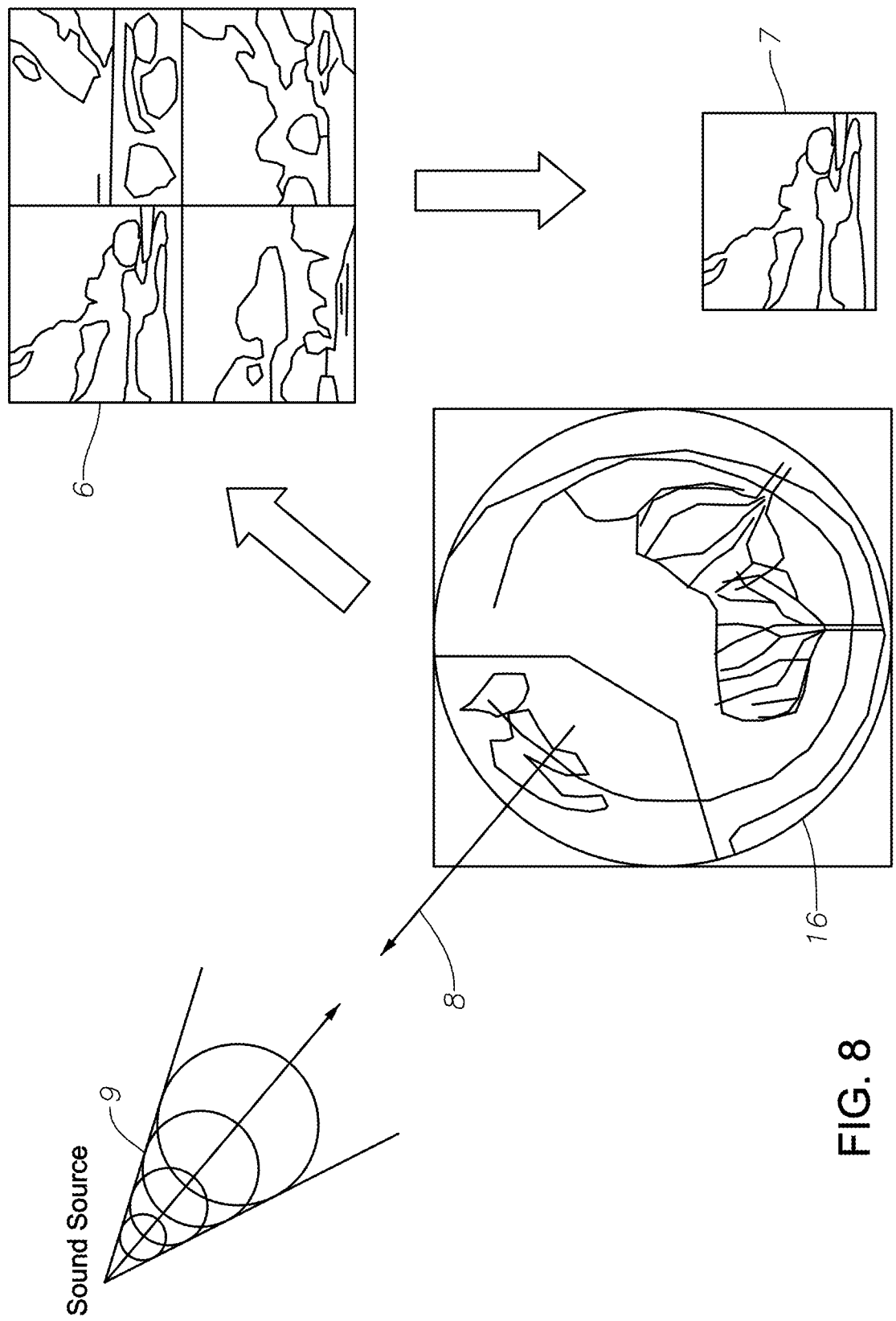
FIG. 8, in accordance with some embodiments of the present disclosure, depicts the transfer of video and pictorial data from the spherical camera of the device of FIG. 6, including the receiving of video/pictorial data, and various exemplary depictions of visual data that may be collected and subsequently isolated.
Figure 9:
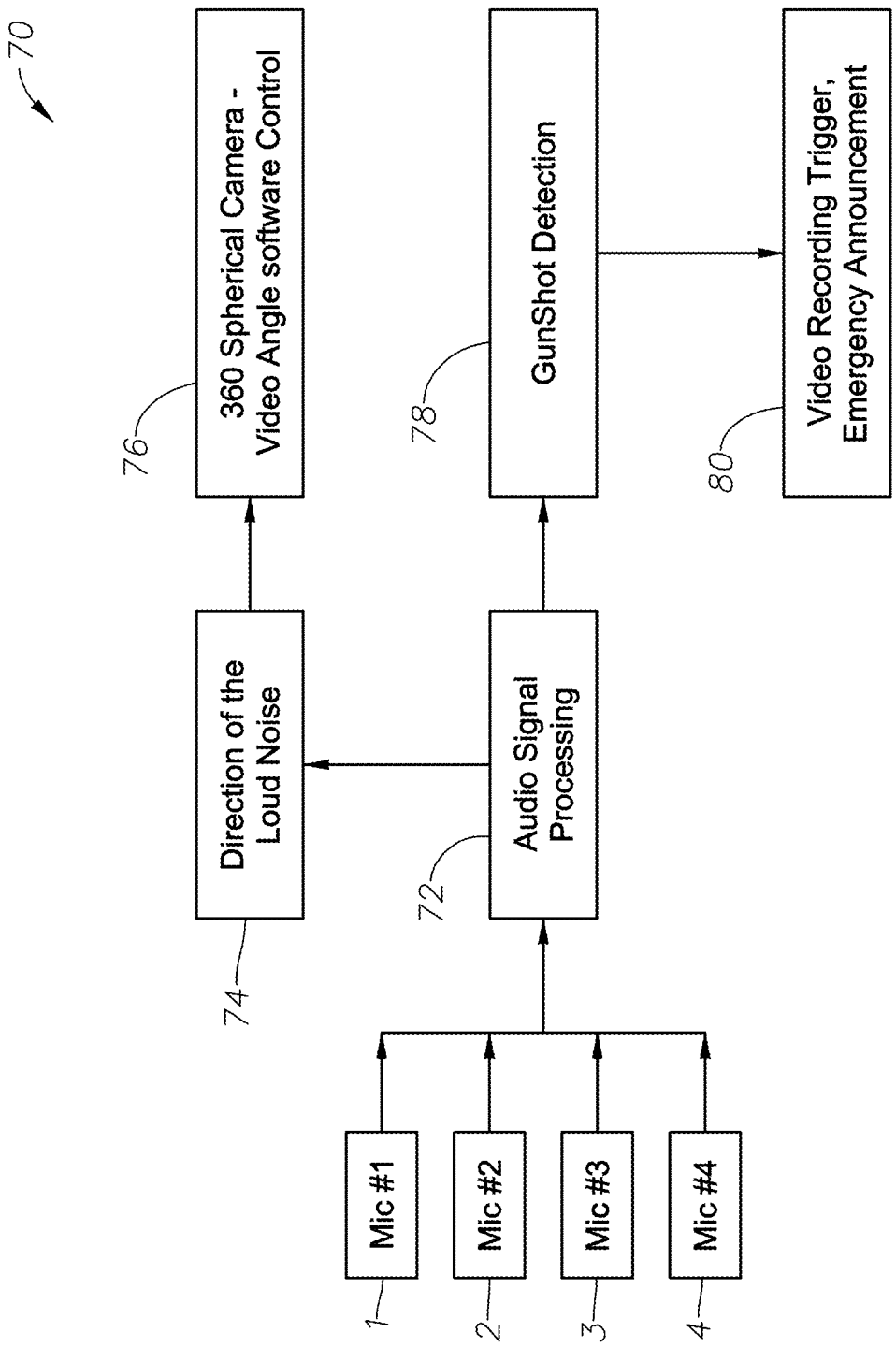
FIG. 9, in accordance with some embodiments of the present disclosure, is a flow schematic of sound data that may be collected from one or more microphones, that is subsequently processed (audio signal processing) to isolate parameters of interest (for example, direction of a loud noise or gunshot detection), and subsequent related action(s) e.g. video recording trigger/emergency announcement in response to gunshot detection or changes to a 360-degree spherical camera via video angle software in order to determine the direction of a loud noise.

Turning to FIG. 6, an overhead view of a camera device 16 comprising a spherical camera that may be used with implementations of this disclosure is depicted. The camera device 16 is configured for roof-mounting on a vehicle 10 and provides a 360-degree view. FIG. 7 depicts the bottom view of the spherical camera device 16, showing (more fully than in FIG. 6) a series of directional microphones (1-4). With the directional microphones (1-4), the approximate direction 8 of sounds emanating from a sound source 9 can be detected. With the combined camera/microphone unit 16, the computer 12 microprocessor can be configured to automatically mark points in the captured video data at which specific sounds 5 are detected (as depicted in FIG. 7) and take snapshots 6 and/or create a video event clip 7 of a predetermined length pre- and post-event (as depicted in FIG. 8). In some embodiments, the camera device 16 may be configured to continually record captured video data in a circular or "failsafe" buffer that can be flushed or transferred for storage to memory. FIG. 9 depicts a schematic flow chart 70 of a spherical camera device 16 as used in combination with the microphones (1-4) to capture and process the detection of gun shots. At step 72, the audio data captured by the microphones (1-4) is processed to determine the approximate direction of the sound source 74. At step 76, the spherical camera device 16 software control adjusts the camera to capture image data in the approximate direction of the sound source. If the audio processing determines that the sound source was a gunshot 78, a gunshot detection signal is sent to trigger the camera device(s) 16 to start recording and an emergency announcement, or actionable notification, or request, is sent via the communication network to the police station 14 or to other nearby devices (step 80). Other embodiments of this disclosure may be implemented with other types of camera devices 16 besides a spherical camera (e.g., using a conventional multi-image sensor camera), to provide the desired image clarity and depth of field. The embodiments of this disclosure may be implemented to incorporate in the described recognition analytics any conventional or future developed sensors providing other types of data besides image/video/audio data (e.g. distance measuring sensors, etc.).

Figure 10:
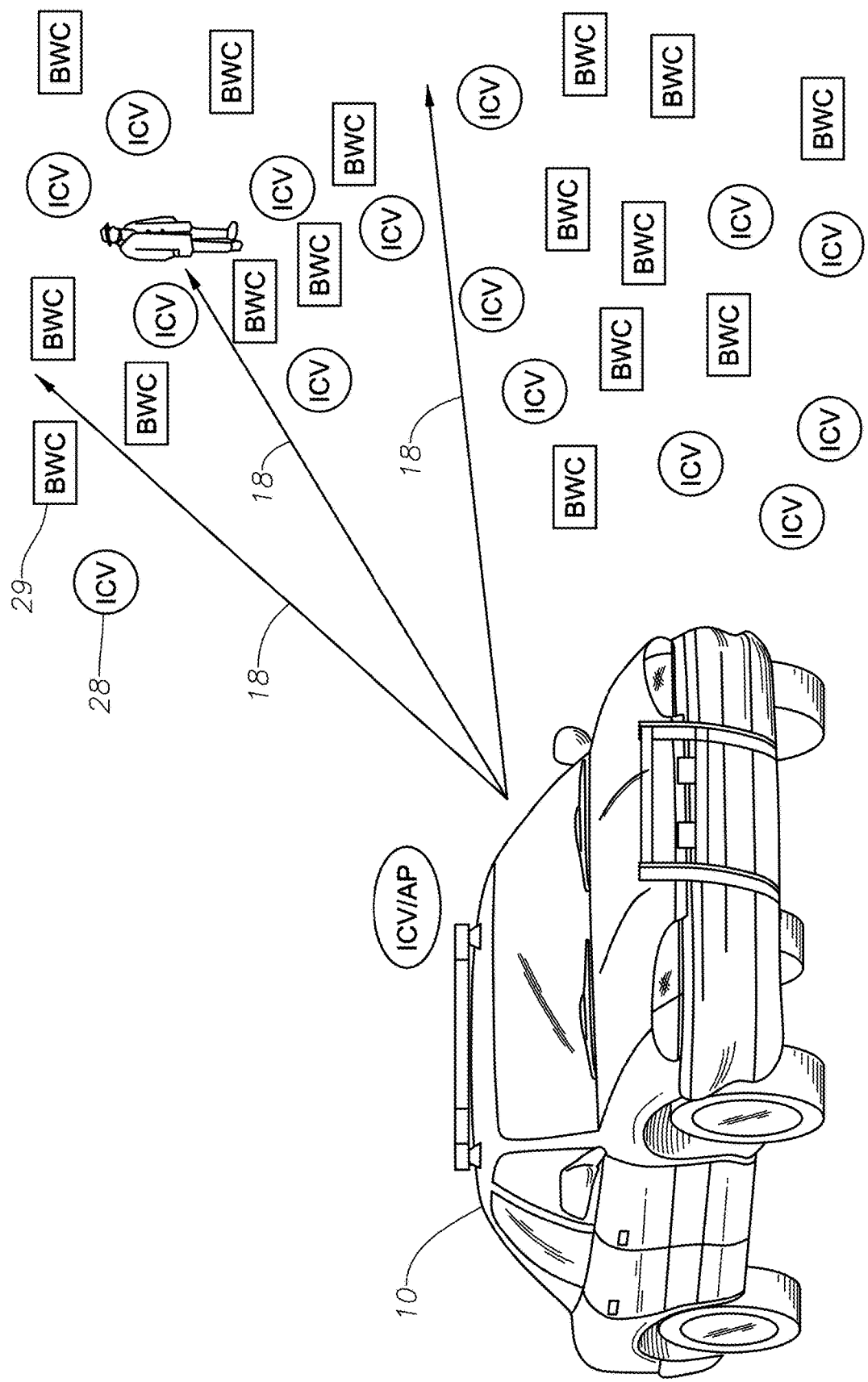
FIG. 10, in accordance with some embodiments of the present disclosure, depicts data flow, specifically video data flow/exchange between a police vehicle with In Car Video (ICV) and Access Point (AP), that is further remotely controlling and exchanging information with various Body Worn Cameras (BWC) and other ICV units in other vehicles.

In some embodiments, the vehicle 10 computer 12 microprocessor may also be configured with instructions to send out a communication (via the communication network 18) to activate the camera devices 16 in other law enforcement vehicles (e.g., in-car video (ICV) units 28), and the BWCs 29 worn by officers, within a set range or perimeter of where the object of interest (corresponding to the designated content) was detected, as depicted by the arrows in FIG. 10. With this embodiment, all the law enforcement vehicles with camera devices 16 and officers with BWCs 29 on the street within the set range or perimeter are turned into scanners, all activated to search for and capture image data relating to the designated content or object of interest. Other embodiments entail the use of an autonomous vehicle 10 to scan the scene for the object attributes in a received communication (e.g. a BOLO alert) and to send a notification to officers nearby and/or to a police dispatch center. The vehicle 10 can track the detected vehicle or person providing real-time or historical location data updates to the officers responding and/or to a police dispatch center. This could help the officers more accurately pursue the vehicle or person of interest.

As previously mentioned, BWCs can be used with implementations of the embodiments of this disclosure. Suitable BWCs include the devices commercially available from COBAN Technologies Inc., in Houston, Tex. (http//www-.cobantech.com). The BWCs are worn by officers on patrol. The BWC can be conveniently clipped to the officer's uniform or body gear as desired. BWCs may also be configured with a microphone to collect audio data. The collected audio data may be transmitted together with the captured image/video and/or metadata to another device (e.g., located in a police car, at a police station, on another police officer, or in the cloud) as described herein. It will be appreciated by those skilled in the art that various conventional BWC devices and storage units may be used to implement embodiments of this disclosure. Similarly, various wireless technologies may also be used to implement the embodiments as known in the art. It will also be appreciated that as technology improves, smaller and lower power camera and transmission devices may become available which may further improve performance and run time. Such devices may easily be integrated into the embodiments of this disclosure.

In some embodiments, the vehicle 10 computer 12 may be configured to perform wireless networked or distributed analytics processing. As previously described, in some embodiments the vehicle 10 computer 12 is configured to access an onboard database and perform the disclosed analytics processing as a stand-alone unit. In other embodiments, the vehicle 10 computer 12 may be configured to communicate via the communication network 18 (e.g. using the cloud) with other computers (e.g. remote ICV units 28 and BWCs 29) to perform a distributed and shared image data analysis. With reference to FIG. 10, the vehicle 10 computer 12 microprocessor may issue a communication to the ICV units 28 in police vehicles and BWCs 29 within a set range, to not only activate the respective camera devices, but also including selected image data information to activate the remote devices to perform a local analysis. For example, if an alert is received by the vehicle 10 computer 12 describing a crime involving suspects in multiple vehicles and the computer detects one of the vehicles, the microprocessor sends a communication (in real-time) to all other units/officers within the set range, including the captured image data or components of the captured image data (e.g. metadata alone; each of video data, audio data, and metadata is considered a component of the captured image data). The ICVs 28 and BWCs 29 receiving the information can then focus on scanning to detect for the other vehicles described in the alert. Similarly, image data captured by the ICVs 28 and BWCs 29 can be relayed back to the vehicle 10 computer 12 via the communication network 18 for hubbed real-time processing. In this manner, the ICVs 28 and BWCs 29 are used to form a virtual net providing real-time processing and communication. The communication network 18 (e.g. the cloud) provides a relay data point for all ICVs 28, BWCs 29, vehicles 10, and any other wirelessly linked devices or systems in the vicinity where events of interest are occurring, as well as a relay data point to or from remote locations. This network provides for vehicle-to-vehicle and system-to-system distributed communications. The communication loop in such embodiments may also include the police station, dispatch headquarters, and other law enforcement agencies.

In some embodiments, the ICV 28 is configured to detect and take snapshots, or receive snapshots from a wearable device (e.g. BWC 29), of a person's face to run facial recognition locally or by transmitting the data to a remote server (e.g. server 15) for further analytics. This further enhances the BOLO capabilities. For example, a BOLO may include an alert to look for a white male, wearing a black jacket, having an age in the mid-twenties, etc. The detection of attributes is also enhanced, such as detection of approximate age, gender, and race. The use of AI software and other advanced software applications may provide additional benefits. Some embodiments may also be configured to receive video data via transmission such as Real Time Streaming Protocol (RTSP) streaming for detection and analytics of attributes and facial recognition. Some embodiments of this disclosure provide for selective search and export of the captured information. In one such embodiment, an authorized user linked to the computer 12 microprocessor via the communication network 18 (e.g., using a smart phone, laptop computer, tablet, etc.) can analyze the information according to specific criteria established by the user. For example, a user can select or draw an area on a map to display vehicles in a given region, along with their associated data such as specific location data/time/number of recorded events/event type/duration, license plate data, vehicle type, shape, color etc. If an event or specific data is of interest, the user can select an option to send a request to any or all vehicle computers 12 to scan their storage drives, that are continuously recording, for the desired information and send back a response with the search results or to retrieve the designated data with time markers of start and stop points to export video, snapshots, or metadata. This embodiment can be implemented for a local or global application.

Figure 11:
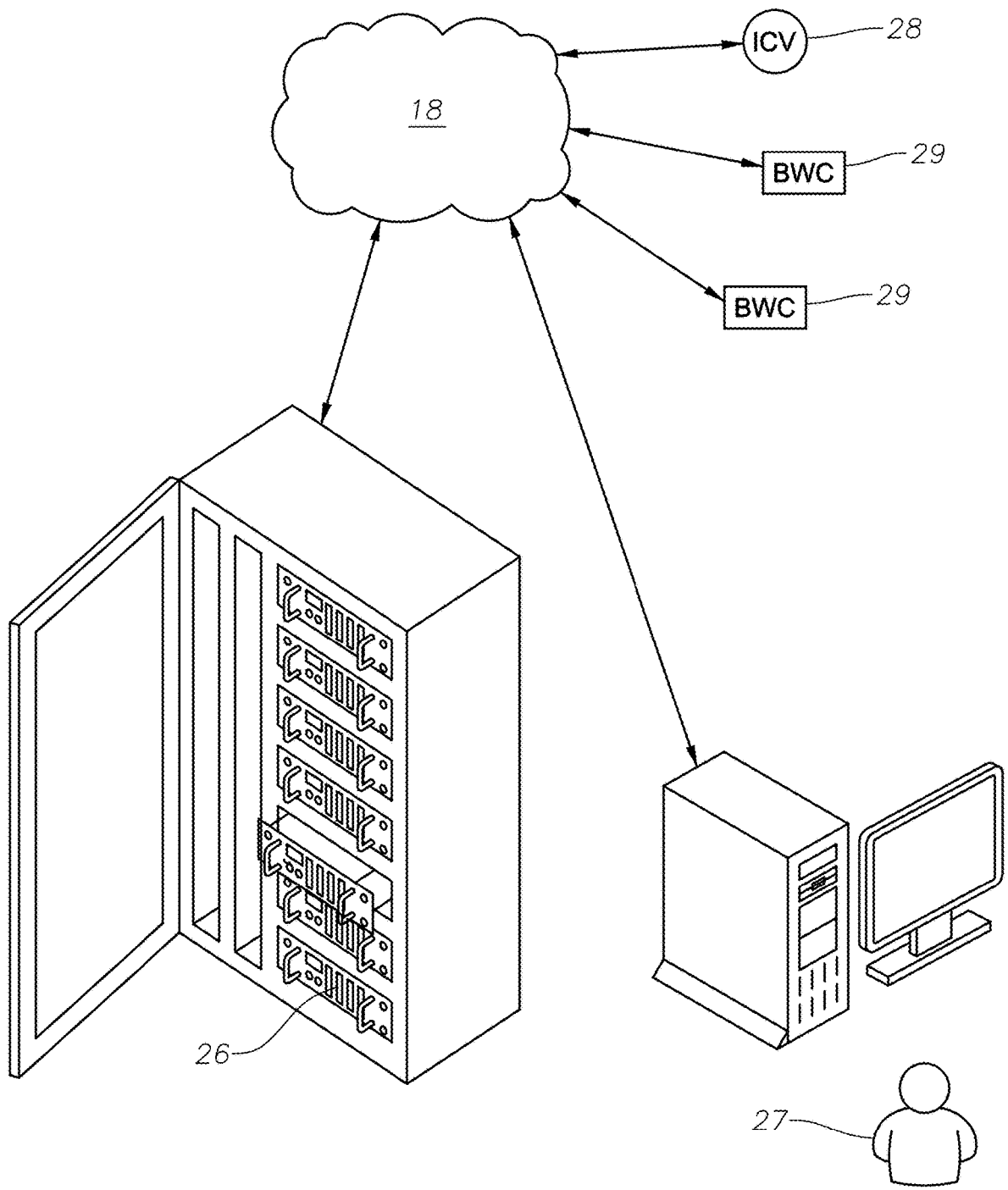
FIG. 11, in accordance with some embodiments of the present disclosure, depicts a Global Data Access System configuration.

FIG. 11 depicts another embodiment of this disclosure. A computer server 26 is linked to one or more camera devices 16 (e.g. ICV units 28 and BWCs 29) via the communication network 18. Some embodiments may also incorporate fixed camera devices 16 (e.g. cameras on buildings, light poles, etc.). This embodiment provides for shared Global Data Access and distribution, allowing authorized users 27 to access the server 26 via the communication network 18. With this embodiment, the server 26 provides a centralized repository for the specific data and information of interest to a user group (e.g. law enforcement agencies). Using such a globally shared server, authorized users 27 can send data of interest to the server 26 for storage (e.g., in local memory or linked data storage). In some embodiments, the server 26 may be partially or entirely implemented as a virtual server in the cloud. Such cloud computing embodiments offer flexibility of scalability. The server 26 is also configured to analyze the data sent to it (encompassing audio, video, metadata, and/or any other available telemetry) by an authorized user in the group, or captured by the linked mobile device(s) 16, to analyze and search for the presence of designated content and designated attributes in the data, as described herein. The server 26 may also be configured to perform full or partial analytics on the captured image data and the data sent by authorized users. The data stored in the server 26 could remain available for a defined period to allow authorized users access to the data. For example, if a BOLO alert is issued an application on the server 26 can scan the stored data (including stored metadata) and if an attribute of interest is detected the application can generate a request to be sent to the linked camera device 16 that captured the detected image data to mark configurable in (start) and out (stop) points of the recorded video, audio, metadata, etc. The marked image data can also be exported and/or uploaded or a live stream can be started if the camera device is still near the location where it originally captured the data. If high importance image data is detected, the server 26 can send alerts or emails to users of the Global Data Access System. For example, if an agency (police department, FBI, DEA, ATF, etc.) is looking for a vehicle having a specific color and make or license plate, an authorized user can enter this information as designated content/attributes in to the Global Data Access System server 26 (e.g., using a smartphone, desktop computer, laptop computer, or tablet device). The server 26 then sends a command, via the communication network 18, to any linked camera device 16 to analyze its recorded image data to search for matching audio, video, and/or metadata, as the case may be. If a match or near match is found, the device that found the match or near match notifies the server 26, and the detected matching or near matching image data, or components thereof (e.g. metadata), are then uploaded and saved (e.g. to local memory) by the server 26. In some embodiments, the server 26 may also be configured to send a notice (e.g. via email) to the searching agency or others, regarding the detected data. In some embodiments, the server 26 may be configured to perform the image data analysis on real-time image data being collected by any linked camera devices. The server 26 may also be configured to analyze the data stored in memory and/or captured by the camera device(s) 16 according to criteria established by an authorized user 27 having access to the server 26 via the communication network 18 (e.g. in response to a BOLO alert).

Figure 12:
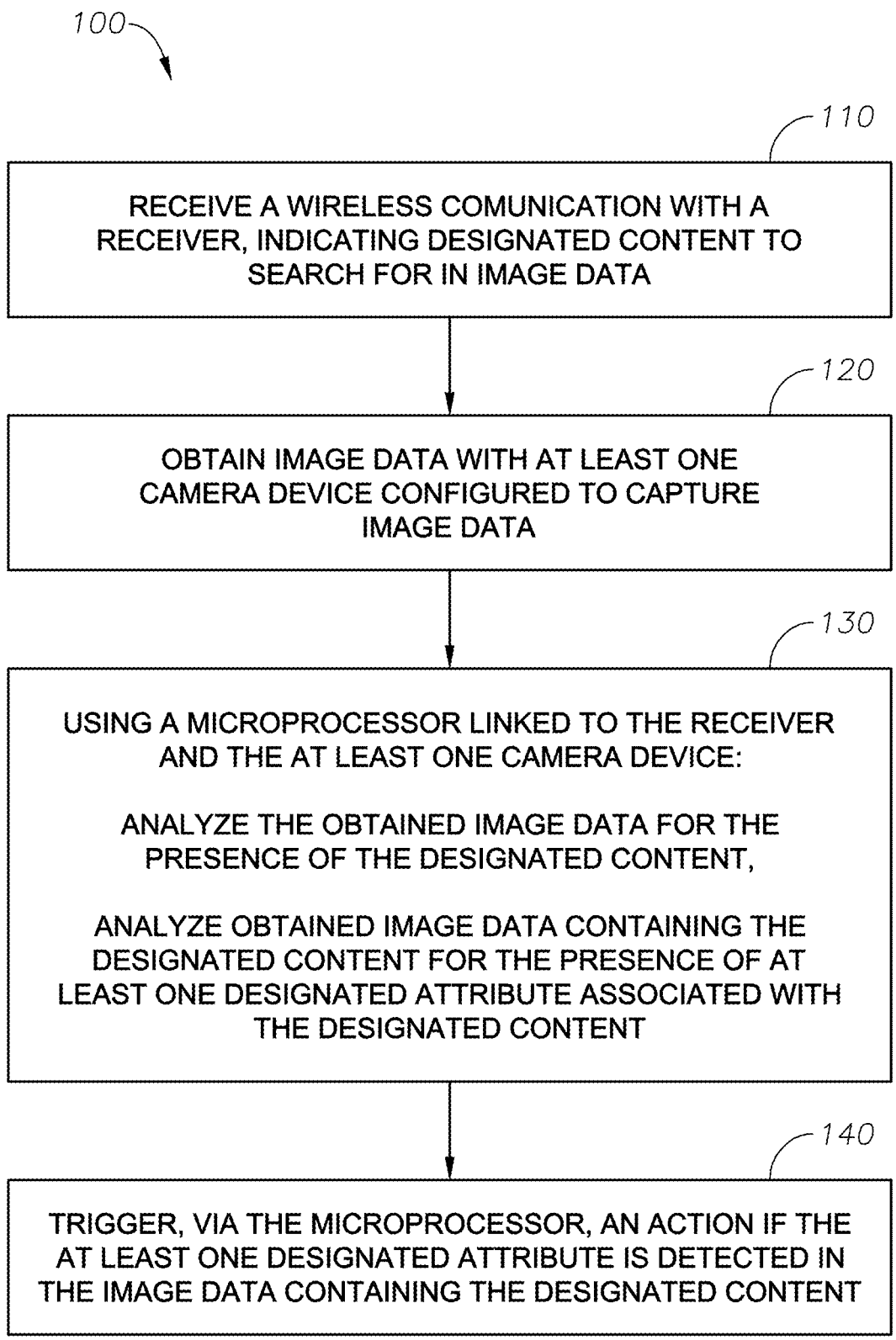
FIG. 12, in accordance with some embodiments of the present disclosure, is a flow chart depicting, at a top level, a method for triggering an action in response to capture and characterization of image data.

FIG. 12 is a flow chart depicting a method 100 according to an embodiment of this disclosure. At step 110, a wireless communication is received with a receiver, indicating designated content to search for in image data. The communication may be conveyed via the communication network 18. At step 120, image data is obtained using at least one camera device 16 (e.g., ICV 28, BWC 29) configured to capture image data. At step 130, using a microprocessor linked to the receiver and the at least one camera device, (a) the obtained image data is analyzed to determine if it contains the designated content and (b) obtained image data containing the designated content is analyzed to determine if it contains at least one designated attribute associated with the designated content. This may be implemented using an analytics engine and processing as described herein. At step 140, an action is triggered by the microprocessor if the at least one designated attribute is detected in the obtained image data containing the designated content. This entails any of the actions that may be triggered by the microprocessor as described herein.

Figure 13:
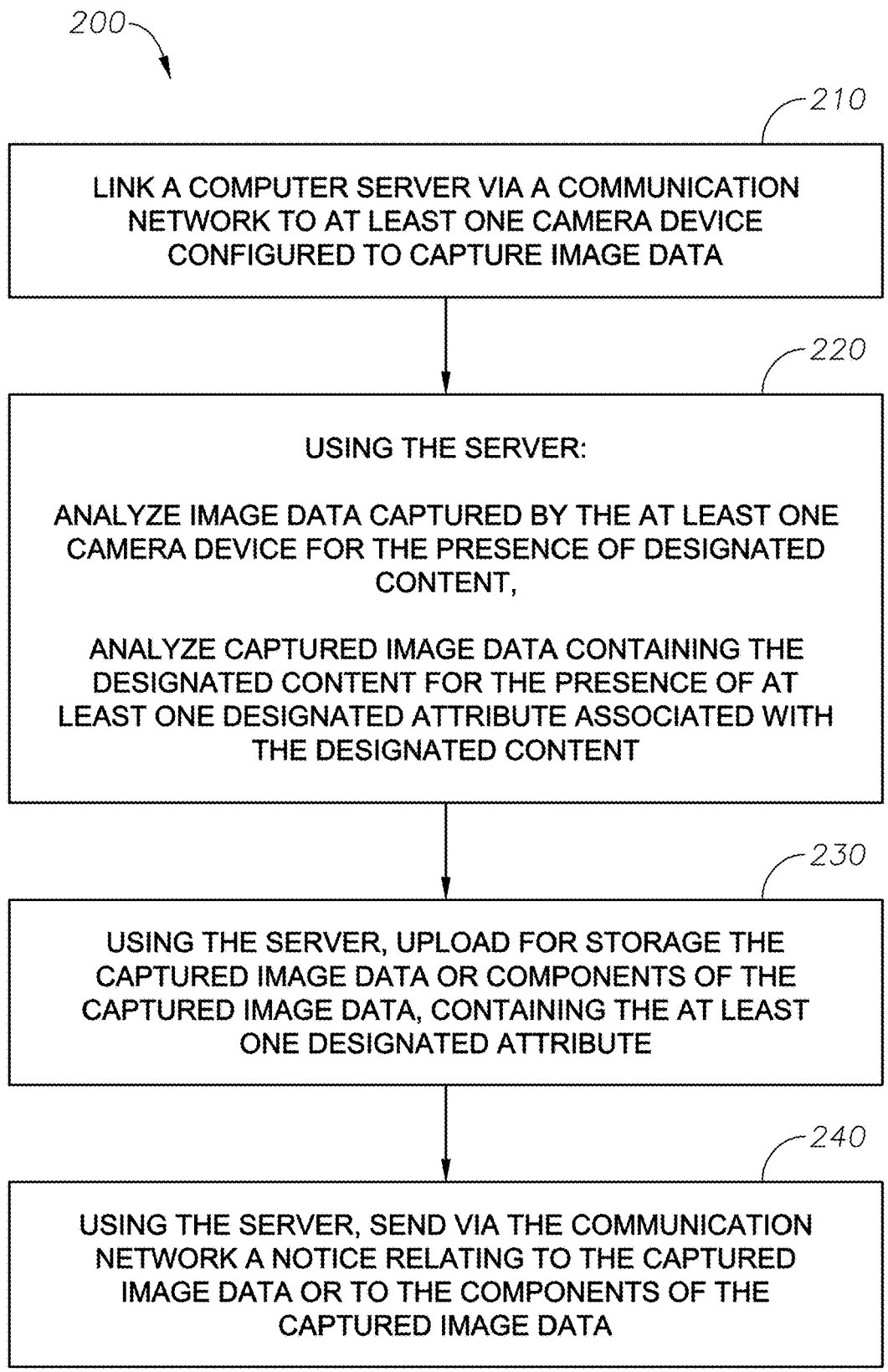
FIG. 13, in accordance with some embodiments of the present disclosure, is a flow chart depicting, at a top level, another method for triggering an action in response to capture and characterization of image data.

FIG. 13 is a flow chart depicting a method 200 according to an embodiment of this disclosure. At step 210, a computer server is linked via a communication network to at least one camera device 16 (e.g., ICVs 28, BWCs 29) configured to capture image data. At step 220, using the server, (a) image data captured by the at least one camera device is analyzed for the presence of designated content and (b) captured image data containing the designated content is analyzed for the presence of at least one designated attribute associated with the designated content. This may be implemented using an analytics engine and processing as described herein. At step 230, using the server, the captured image data or components of the captured image data, containing the at least one designated attribute, are uploaded for storage. At step 240, using the server, a notice relating to the captured image data or to the components of the captured image data, is sent via the communication network.

Figure 14:
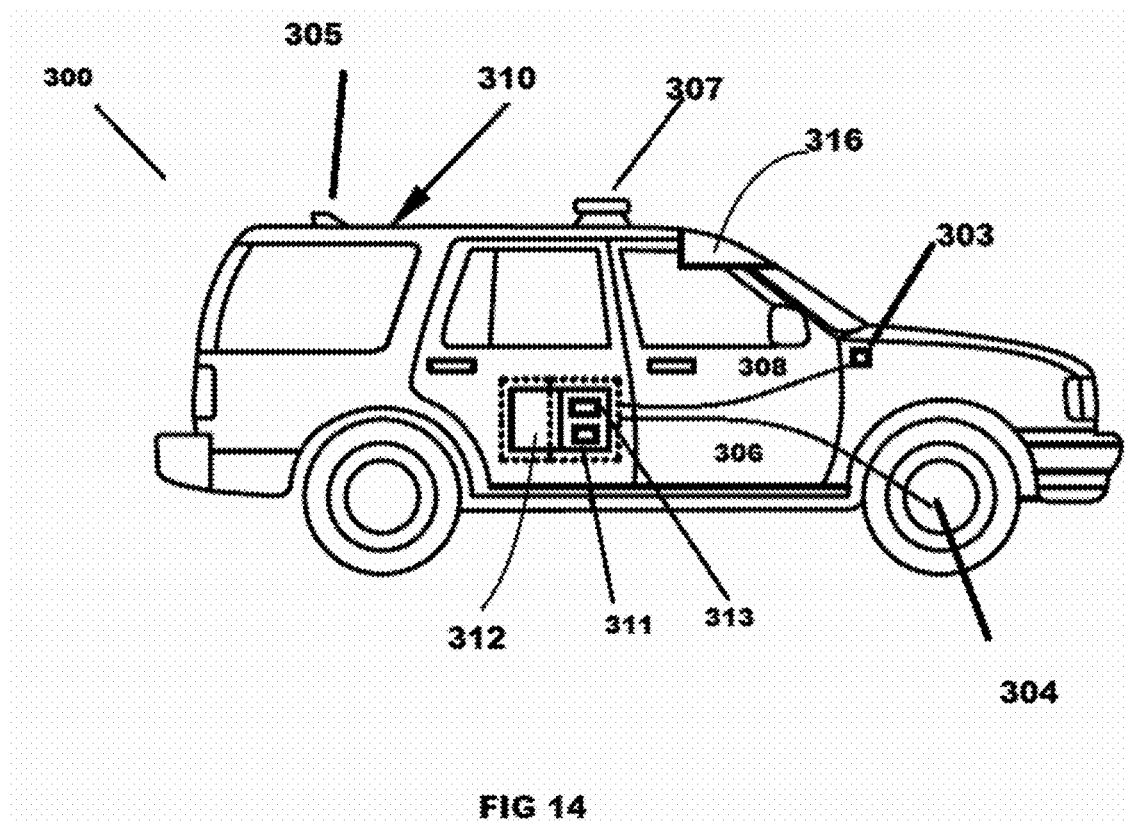
FIG. 14, in accordance with some embodiments of the present disclosure, depicts a system including a vehicle with a camera, sensors and a computer, for evaluating driving behavior and triggering actions based upon the evaluated behavior.

FIG. 14 depicts disclosure a system 300 including a vehicle 310, wherein the vehicle 310 includes a number of components. System 300 features at least one camera device 316 configured to capture image data. Camera device 316 is mounted to vehicle 310. System 300 also comprises at least one sensor configured to provide vehicle telemetry data to computer 312. The at least one sensor may include, but is not limited to, an accelerometer 303, a speed sensor 304, and/or a GPS device 305 (e.g. antenna). The sensors transmit telemetry data by communication links 306, 308 and 309 (which may be wired or wireless) to a computer 312. Computer 312 includes a microprocessor 311, an internal memory 313 and an analytics engine as described above. While FIG. 14 depicts the above-referenced components mounted separately and apart from one another throughout vehicle 310, they could also share a single housing mounted in a single location on vehicle 310. Furthermore, one of ordinary skill in the art would understand that one could mount the various components in alternate locations on vehicle 310. The internal memory 313 of computer 312 is configured to store designated content, designated events, triggers, vehicle telemetry, and other data. The microprocessor 311 of computer 312 is configured with instructions to analyze the captured image data and telemetry data for the presence of at least one designated event. As discussed, below, non-limiting examples of designated events may include speeding, driving too slowly, aggressive driving, reckless driving, swerving, collisions, and rollover accidents. The microprocessor 311 of the computer 312 can be further configured with instructions to trigger an action if the designated event is detected based on the captured image data or telemetry data.

As discussed, computer 312 may be configured to store the telemetry data in internal memory 313. The telemetry data may also be transferred to a cloud sever. The telemetry data can be multiplexed and synchronized with the captured image data (or other data) for later analysis, evidence gathering, evaluation, and training. The telemetry data may also be stored as metadata for the captured image data of camera device 316. Preferably, the process of sampling, storing, and analyzing the telemetry data would be initiated automatically to reduce the workload on the LEO. For example, computer 312 may begin sampling, storing, and analyzing the telemetry data when vehicle 310 is started if the law enforcement agency intends to monitor the driving behavior of the LEO at all times. Alternatively, the computer 312 may begin sampling, storing, and analyzing the telemetry data when the emergency light bar 307 is activated if the law enforcement agency intends to monitor the driving behavior of the LEO when the LEO is responding to call or engaged in a pursuit. Alternatively, the computer 312 may begin sampling, storing, and analyzing the telemetry data when motion of the vehicle is detected or the vehicle reaches a particular speed. Additionally, the computer 312 can bookmark the activation of the emergency light bar 307 within the metadata for the captured image data.

According to one aspect of this disclosure, system 300 may be configured to detect the speed of vehicle 310. The computer 312 may determine the speed of vehicle 310 in several different ways. For example, the computer 312 may sample the speed sensor 304. Speed sensor 304 may be located on the wheel, within the wheel hubs, on brake components, within the transmission, within the torque converter, within the differential, on the flywheel or other rotating components of vehicle 310. The speed sensor can be of a magnetic type (e.g. Hall Effect, or Reed Switch) or an optical speed sensor. The computer 312 may also sample the telemetry data from GPS device 305 at a known interval and calculate the change in position of the vehicle 310 over a known time interval using data obtained from the GPS device 305. The computer 312 may also sample the telemetry data from accelerometer 303 at a known interval. The computer 312 may then calculate the vehicle's speed based upon its acceleration over a period of time.

The computer 312 may also employ the above-referenced analytics engine to analyze the image data captured by the camera device 316. As discussed, above, the captured image data can be analyzed to determine physical dimensions and parameters of observed objects, which can then be compared to known dimensions and parameters in the database library. For example, the analytics engine can recognize known objects (i.e. with known dimensions) in the captured image data. The image data can be sampled at a known rate. The computer 312 can calculate the change in size of the known objects relative to the entire frame of the image. In other words, the rate at which an object of known size appears to increase (or decrease) can be used to calculate the relative speed of the vehicle 310 to the known object. Thus, this is one way in which the computer 312 can determine the speed of vehicle 310 without use of sensors (speed sensor, accelerometer, GPS device, etc.).

Figure 15:
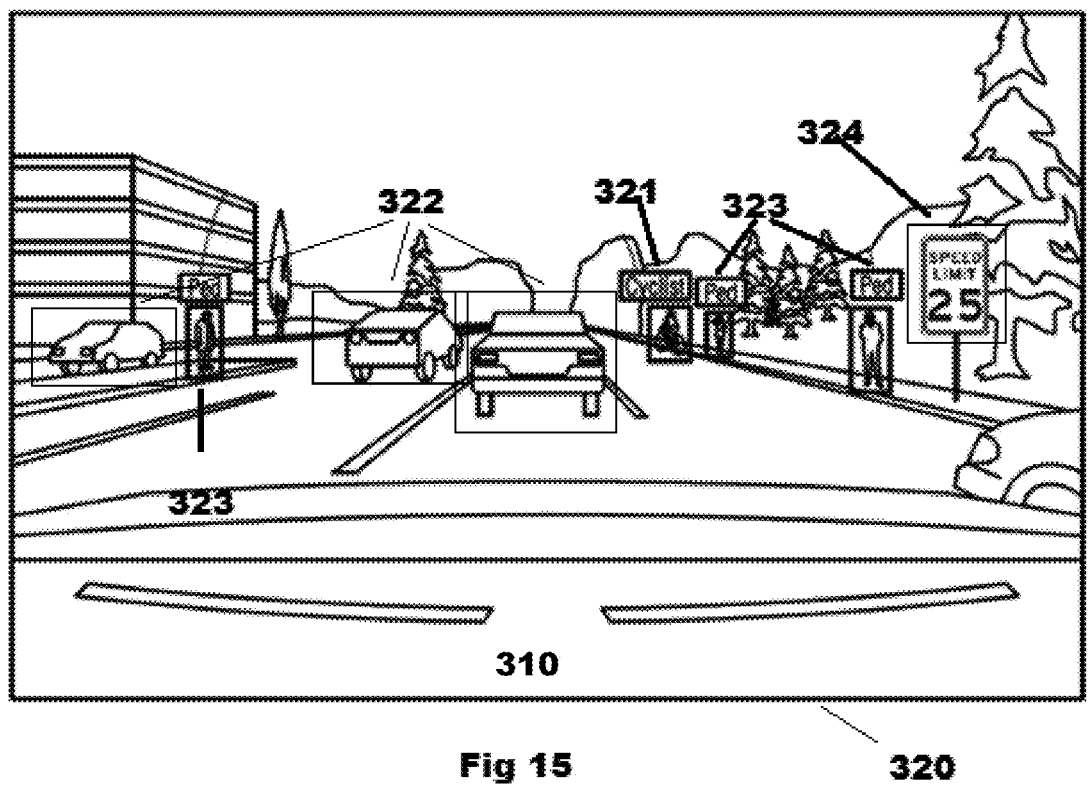
FIG. 15, in accordance with some embodiments of the present disclosure, depicts a scene of a video frame captured by the onboard camera of a police vehicle illustrating the instructions executed by an onboard computer to recognize a speed limit sign and evaluate a driver's driving behavior in relation to the speed limit sign.

FIG. 15 depicts a scene as processed by the computer 312 microprocessor 311 to detect various shapes and objects according to embodiments of this disclosure. The computer 312 recognizes shapes (shown in bounding boxes) in a video frame 320 of the image data captured by camera device 316. Non-limiting examples of the shapes identified by the computer 312 include cyclists (bounding box 321), other vehicles (bounding boxes 322), pedestrians (bounding boxes 323), and traffic signs (bounding box 324).

The computer 312 can also determine the applicable speed limit. The computer 312 can determine the applicable speed limit from one or more sources. For example, the internal storage for the computer 312 can store a database which relates location to the applicable speed limit. Sampling the data from the GPS device 305, computer 312 can look up the corresponding applicable speed limit from the database in its internal storage. In some cases, the GPS device 305 may receive explicit local speed limit data. As depicted in FIG. 15 the computer 312 may also derive the applicable speed limit from recognition of a speed limit sign (bounding box 324) from the image data captured by the camera device 316. In this case, the analytics engine can recognize speed limit signs in the captured image data in the same way the computer recognizes license plates as discussed, above. Specifically, computer 312 can employ OCR, pixel scanning, and shape/pattern recognition analytics to analyze and search the captured data for the applicable speed limit. The computer 312 may also employ a combination of data sources to determine the applicable speed limit. For example, the computer 312 may default to the stored speed limit where posted speed limit signs are not present. Where posted speed limit signs are present, the computer 312 may determine the applicable speed limit from those posted speed signs. Having determined the speed of the vehicle 310 and the applicable speed limit, the computer can compare the two in order to detect the presence of one or more designated events. A speed of the vehicle 310 above the applicable speed limit would indicate the designated event of speeding. The computer 312 can also be configured with instructions to detect when vehicle 310 is driving below the applicable speed limit by a predetermined margin. This may indicate a distracted, fatigued, or intoxicated driver.

Figure 16:
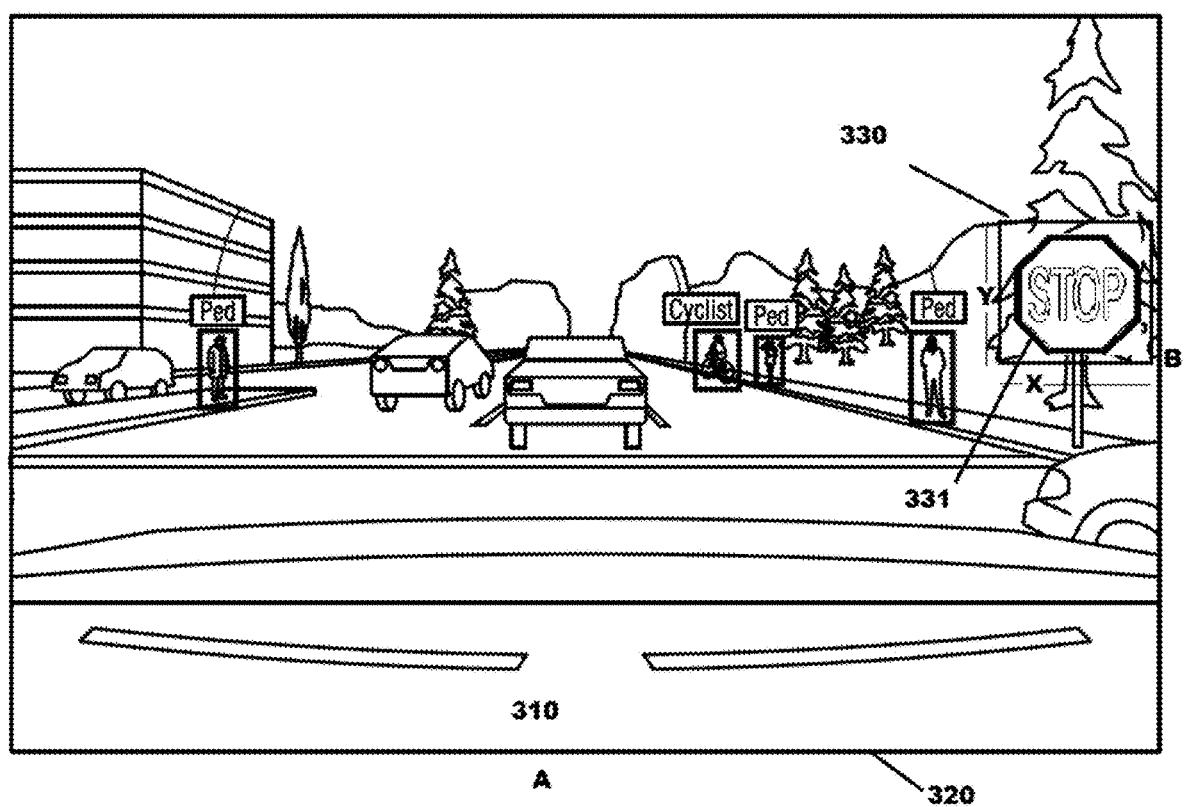
FIG. 16, in accordance with some embodiments of the present disclosure, depicts a scene of a video frame captured by the onboard camera of a police vehicle illustrating the instructions executed by an onboard computer to recognize a stop sign and evaluate a driver's driving in relation to the stop sign.

System 300 may be configured to monitor different designated events indicative of disfavored driving behaviors. For example, the system can detect when vehicle 310 fails to stop at a stop sign. FIG. 16 depicts a scene when vehicle 310 approaches stop sign 331. The analytics engine can recognize stop sign 331 in the captured image data (i.e. bounding box 330). The dimensions of the stop sign 331 as recognized by computer 312 are represented by "X" and "Y" of the bounding box 330 in FIG. 16. The dimensions of the video frame 320 are represented by "A" and "B" in FIG. 16. As the vehicle 310 approaches the stop sign 331, the dimensions X and Y increase relative to the dimensions A and B of the video frame 320. In other words, the stop sign 331 grows larger in the video frame 320.

The computer 312 may sample the telemetry data from the vehicle 310 and/or analyze the image data captured by the camera 316 to determine whether the vehicle 310 stopped at the stop sign 331. For example, the computer 312 may sample the captured image data at a known rate. Having identified stop sign 331 represented by bounding box 330 in the video frame 320, the computer 312 would calculate the dimensions X and Y for each sampling of the video frame 320. Where two or more samplings of the video frame 320 are equivalent, the computer 312 could determine that the vehicle 310 was not moving relative to the stop sign 331 (which is stationary) for the period of time between the video samples. In other words, two or more samplings of the video frame 320 with constant dimensions X and Y are indicative of a stationary vehicle. In contrast, where dimensions X and Y continuously increase until the stop sign 331 disappears out of the video frame 320 (i.e. X and Y are not constant for two or more samplings of the video frame 320), the computer 312 may determine that the vehicle 310 did not come to a complete stop. Alternatively, the computer 312 can calculate the change in size of known objects (e.g. the stop sign 331) relative to the entire frame of the image to calculate the relative speed of the vehicle 310 to the known object. Analyzing this data, the computer 312 can determine if vehicle 310 has come to a complete stop (i.e. speed=0) within a predetermined proximity of a stop sign. The computer 312 may also sample the telemetry from the vehicle's speed sensor 304, accelerometer 303, and/or GPS device 305 to determine the vehicle's speed.

Figure 17:
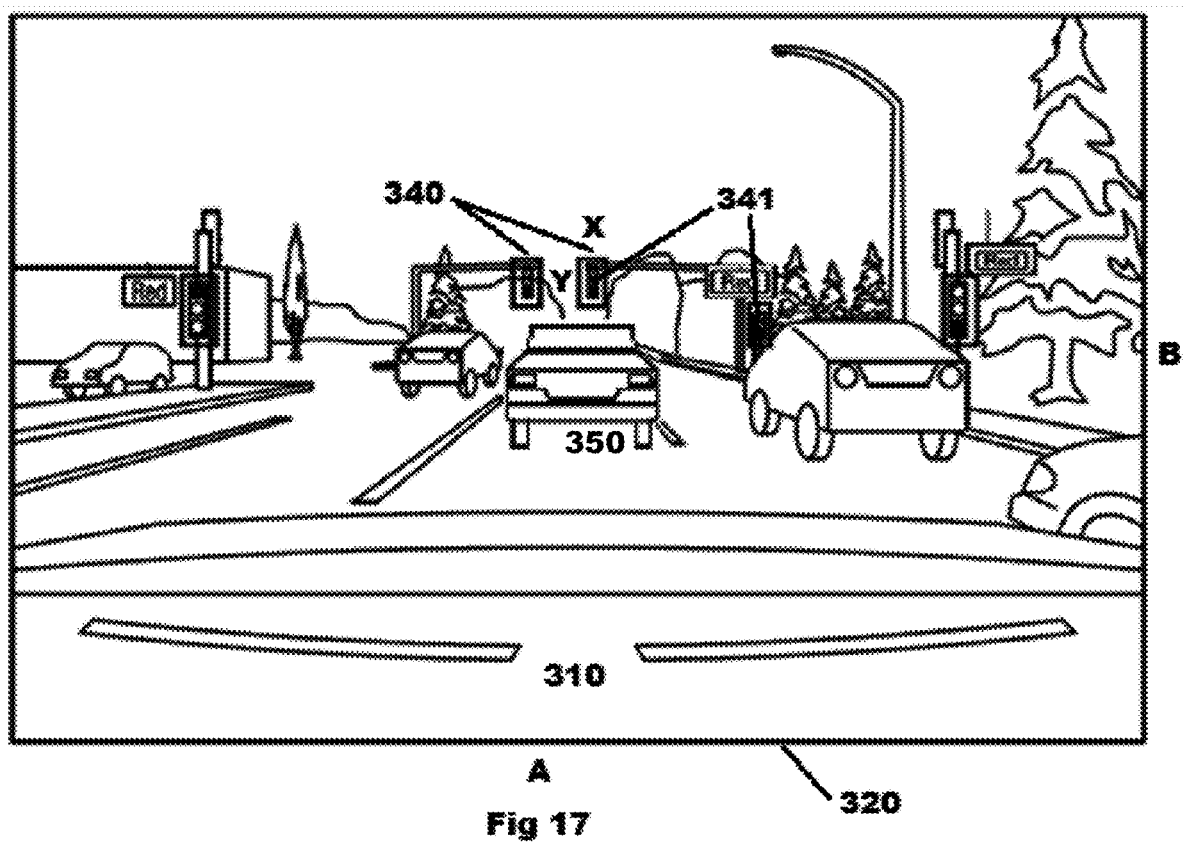
FIG. 17, in accordance with some embodiments of the present disclosure, depicts a scene of a video frame captured by the onboard camera of a police vehicle illustrating the instructions executed by an onboard computer to recognizing a traffic light and evaluate a driver's driving in relation to the traffic light.

Similarly, the system 300 may be configured to detect when the vehicle 310 fails to stop at a stop light. FIG. 17 depicts a scene when the vehicle 310 approaches a traffic light 341. The analytics engine can recognize the traffic light 341 in the captured image data (i.e. bounding box 340). The dimensions of the computer's recognition of the traffic light 341 are represented by "X" and "Y" of bounding box 330 in FIG. 17. The dimensions of the video frame 320 are represented by "A" and "B" in FIG. 17. As the vehicle 310 approaches the traffic light 341, the dimensions X and Y increase relative to the dimensions A and B of the video frame 320. In other words, the stop light 341 grows larger in the video frame 320.

The computer 312 may sample the telemetry data from the vehicle 310 and/or analyze the image data captured by the camera 316 to determine whether the vehicle 310 stopped at the traffic light 341. For example, the computer 312 may sample the captured image data at a known rate. Having identified traffic light 341 represented by bounding box 340 in video frame 320, the computer 312 would calculate the dimensions X and Y for each sampling of the video frames sampled. Where two or more samplings of the video frame 320 are equivalent, the computer 312 could determine that the vehicle 310 was not moving relative to the traffic light 341 (which is stationary) for the period of time between the video samples. In other words, two or more samplings of the video frame 320 with constant dimensions X and Y are indicative of a stationary vehicle. In contrast, where (i) the computer 312 recognizes the traffic light 341 as red, and (ii) dimensions X and Y continuously increase until the traffic light 341 disappears out of video frame 320 (i.e. X and Y are not constant for two or more samplings of the video frame 320), the computer 312 may determine that the vehicle 310 did not come to a complete stop. Alternatively, the computer 312 can calculate the change in size of the known objects (e.g. the traffic light) relative to the entire frame of the image to calculate the relative speed of the vehicle 310 to the known object. Analyzing this data, the computer 312 can determine if the vehicle 310 has come to a complete stop (i.e. speed=0) within a predetermined proximity of the traffic light 341. The computer 312 may also sample the telemetry from the vehicle's speed sensor 304, accelerometer 303, and/or GPS device 305 to determine the vehicle's speed.

In another embodiment the computer 312 samples telemetry from the GPS device 305. The computer 312 may determine the vehicle's position at various times determined by the sample rate. The computer 312 can calculate the change in position relative to the sample period to determine the vehicle's speed. Similarly, the computer 312 can calculate the acceleration (i.e. change in speed over time). In another embodiment, the analytics engine can recognize known fixed (i.e. stationary) objects (e.g. signage) in the captured image data. The image data can be sampled at a known rate. The computer 312 can calculate the change in size of the known objects relative to the entire video frame as discussed above. In other words, the rate at which fixed objects of known size appear to increase (or decrease) can be used to calculate the relative speed of the vehicle 310 to the known fixed objects. With this data, the computer 312 can calculate the acceleration of the vehicle 310. This calculated acceleration may also be used to determine whether the driver is driving aggressively.

In another aspect of the disclosure, the system 300 can detect a near collision with another vehicle, pedestrian or object. As discussed, above, physical dimensions and parameters of real-world objects can be analyzed to determine respective spacing and dimensions, which can then be compared to the real-world parameters in the database library of known items and dimensions. The analytics engine can recognize known objects (i.e. with known dimensions) in the captured image data. The image data can be sampled at a known rate. The computer 312 can calculate the change in size of the known objects relative to the entire video frame of the captured image. The rate at which an object of known size appears to increase in the image frame can be used to calculate the relative closing speed of the vehicle 310 to the known object. Where the known object is fixed, the analytics engine can calculate the absolute speed and acceleration of the vehicle using the techniques disclosed above.

System 300 can sample the vehicle telemetry and store the telemetry data on internal storage and/or upload the telemetry data to a cloud server. The computer 312 may store separate telemetry files from each sensor, or it may multiplex the telemetry data from multiple sensors into a single file. The telemetry data may be stored in a separate file from the video images captured by the camera device 316 or the telemetry data may be stored in metadata for the video file of the video images captured by the camera device 316. The computer 312 may transmit any of the captured image data, telemetry data and metadata via the communication network for viewing on a smart phone, tablet, PC, or at a remote location. In some embodiments, the vehicle 310 computer 312 may also be configured to mark start and end points in the captured image data, telemetry data and/or metadata. In other embodiments, the vehicle 310 computer 312 may also be configured to isolate images or produce snapshots or video clips associated with the metadata. The computer 312 may also be configured to isolate portions of the telemetry data associated with the metadata. All of this data can be stored locally for a predetermined time or on a FIFO basis; it can also be uploaded to a remote location continually or in configurable intervals and packet sizes.

Figure 18:
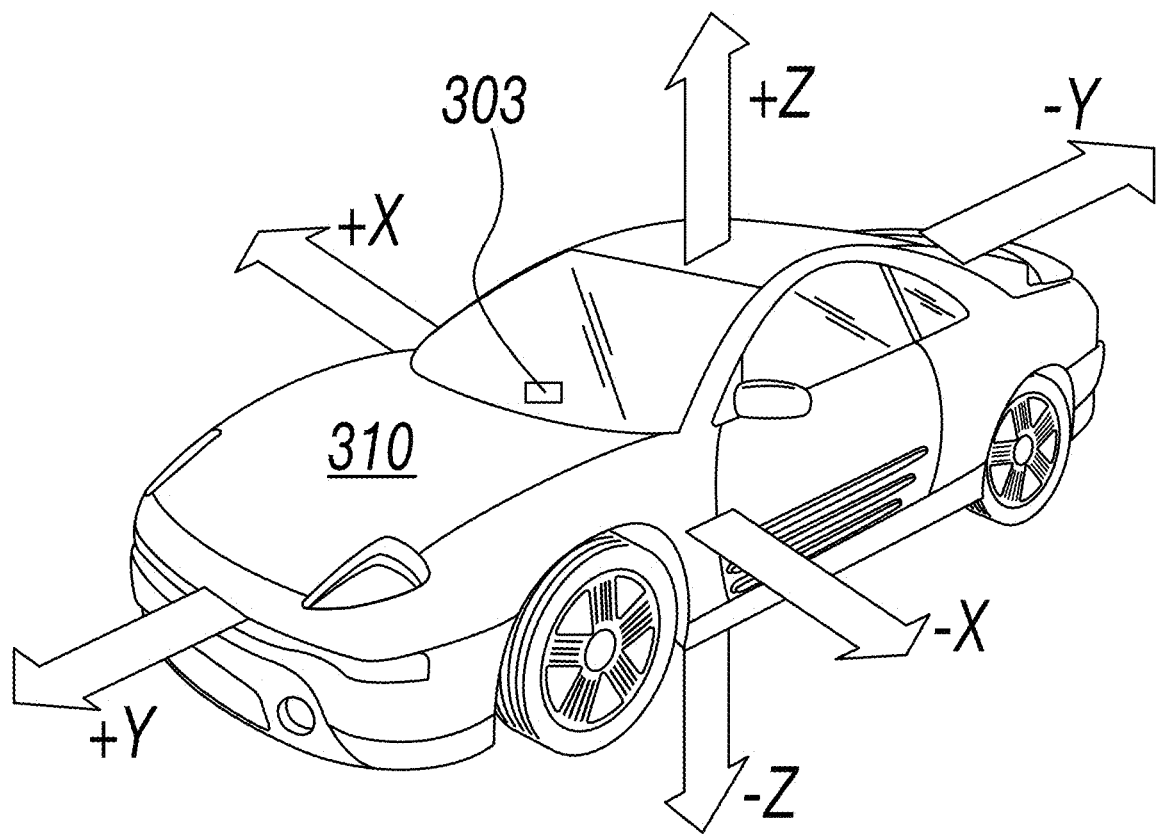
FIG. 18, in accordance with some embodiments of the present disclosure, depicts an accelerometer mounted onto a vehicle used by an onboard computer to evaluate a driver's driving behavior based on the acceleration of the vehicle in a number of directions.

Other driving behaviors can be monitored as well. The computer 312 may be configured to monitor telemetry data from the accelerometer 303. FIG. 18 depicts the six vectors which can be measured by a 3-axis accelerometer mounted to the vehicle 310. A vehicle's longitudinal acceleration is depicted as +/−Y values. A positive value (+Y) represents the vehicle's acceleration. A negative value (−Y) represents the vehicle's deceleration. A vehicle's lateral acceleration is depicted as +/−X values. A negative value (−X) represents the vehicle's change in direction to the left. A positive value (+X) represents the vehicle's change in direction to the right. A vehicle's vertical acceleration is depicted as +/−Z values. A negative value (−Z) represents the vehicle's change in direction down. A positive value (+Z) represents the vehicle's change in direction up. It should be noted that this disclosure refers to acceleration values as a multiple of the acceleration due to gravity at the Earth's surface, which this disclosure identifies with the variable "G" or "Gs" (e.g. 2 Gs=2×9.80665 m/s2).

Having sampled the vehicle telemetry and captured the image data, the computer 312 can also be configured with software instructions to determine if the driver's behavior falls within or outside one or more sets of predetermined parameters. For example, the computer 312 can be configured with software instructions to determine if the values of accelerometer 303 (in any direction) exceed one or more predetermined thresholds. While this example is offered in connection with the sampling telemetry data from the accelerometer 303, the computer 312 can also be configured with software instructions to determine if other telemetry data (e.g. speed, etc.) falls within or outside one or more sets of predetermined parameters.

Further in regard to acceleration, the computer 312 may, for example, be configured to monitor longitudinal acceleration and deceleration (i.e. the vehicle's acceleration or deceleration in the forward-backward direction) by sampling the Y-values of accelerometer 303. Additionally, the computer 312 can be configured with software instructions to determine if the vehicle's acceleration or deceleration is excessive—i.e. above one or more predetermined thresholds. Additionally, the computer 312 can monitor lateral acceleration and deceleration (i.e. the vehicle's acceleration in the left or right direction) by sampling the X-values of accelerometer 303. Excessive lateral acceleration is indicative of swift lane changes or swerving. Excessive acceleration in either the X or Y values may indicate disfavored driving behavior such as aggressive driving, distracted driving, fatigue, or a driver under the influence. Significant deceleration would be indicative of a collision.

For example, a high performance vehicle may experience maximum longitudinal acceleration of 0.8 Gs for the Y-values in FIG. 18 when accelerating. The high performance vehicle may experience maximum longitudinal deceleration of −1.3 Gs when decelerating. Maneuvering a high performance vehicle around a circle with a 300 foot diameter may yield maximum lateral acceleration of 1.1 Gs for the X-values in FIG. 18.

A law enforcement agency may determine that safe, attentive driving would be consistent with: (i) maximum longitudinal acceleration of 0.5 Gs for the Y-values when accelerating, (ii) maximum longitudinal deceleration of −0.8 Gs when decelerating, and/or (iii) maximum lateral acceleration of +/−0.7 Gs for the X-values. As discussed, below, computer 312 could trigger one or more actions when these values are above these thresholds.

In another embodiment, a law enforcement agency may also determine the interests of law enforcement (e.g. suspect apprehension or responding to an emergency call) might militate in favor of more aggressive driving. Therefore, the computer 312 can be configured with software instructions to determine if the vehicle's longitudinal or lateral acceleration exceed a second predetermined set of threshold values. This may be so because while the interests of law enforcement may justify more aggressive driving by an LEO, the law enforcement agency may also wish to trigger one or more events based upon this second predetermined set of threshold values for driving. For example, a law enforcement agency may determine that safely responding to an emergency call would be consistent with: (i) maximum longitudinal acceleration of 0.8 Gs for the Y-values when accelerating, (ii) maximum longitudinal deceleration of −1.0 G when decelerating, and/or (iii) maximum lateral acceleration of +/−0.9 Gs for the X-values. It should be noted that the values discussed in connection with the threshold values are provided as non-limiting examples. Law enforcement agencies may employ different values based upon their own judgments.

The computer 312 may also be configured with software instructions to determine whether to bypass the determination of whether vehicle 310 is exceeding the first predetermined threshold values. This determination may be based on one or more inputs such as the activation of the emergency light bar 307 of vehicle 310, a radio communication, a separate control operated by the LEO, or the vehicle's telemetry data. As a non-limiting example, the computer 312 could be configured with software instructions to determine whether emergency light bar 307 of the vehicle 310 has been activated. The activation of the emergency light bar 307 of the vehicle 310 could be used to bypass the determination of whether the vehicle 310 is exceeding the first predetermined threshold values. This may be useful where the LEO is responding to an emergency call and it is expected that the LEO's driving behavior will exceed the first predetermined threshold values.

In another embodiment, the computer 312 may trigger the activation of the emergency light bar 307 of the vehicle 310 if the first predetermined threshold values have been exceeded. This may be useful to reduce the LEO's workload in the case of an emergency call or pursuit. If there is no emergency call or pursuit then it could serve as an alert to the LEO that the LEO has exceeded the first predetermined threshold values.

In yet another embodiment, a law enforcement agency may determine that the interests of law enforcement justify some level of heightened risk from the LEO's more aggressive driving. The law enforcement agency may still seek to limit the risk to the LEO and the public. Therefore, the computer 312 can be configured with software instructions to determine if the vehicle's longitudinal or lateral acceleration exceed a third predetermined set of threshold values. While the interests of law enforcement may justify more aggressive driving by an LEO, the law enforcement agency may also wish to trigger one or more events based upon this third predetermined set of threshold values for driving. For example, a law enforcement agency may determine that danger to the LEO and the public are consistent with: (i) maximum longitudinal acceleration of 0.8 Gs for the Y-values when accelerating, (ii) maximum longitudinal deceleration of −1.1 G when decelerating, and/or (iii) maximum lateral acceleration of +/−1.1 Gs for the X-values.

A similar system of tiered threshold values can also be applied to other types of data. As another non-limiting example, the computer 312 may be configured with software instructions to determine the speed of the vehicle 310. Rather than comparing the vehicle's speed against a first predetermined threshold value, the computer 312 could compare the vehicle's speed against a variable value—e.g. the speed limit. Alternatively, the computer 312 could compare the vehicle's speed against a predetermined range of values around the speed limit—e.g. between (i) the speed limit−10 mph and (ii) the speed limit+5 mph. Alternatively, the computer 312 could compare the vehicle's speed against a predetermined range bounded by the speed limit—e.g. between the speed limit and 10 mph less than the speed limit. Once again, the values provided are for illustrative purposes only and could be determined based on the judgment of each law enforcement agency. Collectively, this disclosure refers to these thresholds (limits of the ranges) as "speed thresholds." Conceptually, an LEO speeding may be a disfavored practice by the law enforcement agency, and driving too slowly may be indicative of another disfavored driving practice such as distracted driving, driving while fatigued, or intoxication. Where the LEO is responding to an emergency call, however, it may be expected that the LEO's driving behavior will exceed the posted speed limit. A law enforcement agency may determine that the interests of law enforcement justify some level of heightened risk from the LEO's more aggressive driving, but the law enforcement agency may still seek to limit the risk to the LEO and the public. Therefore, computer 312 can be configured with software instructions to determine if the vehicle's speed is outside a second speed threshold. Where the LEO's driving behavior exceeds this second speed threshold, computer 312 may trigger one or more actions. Non-limiting examples of such actions are discussed, below, and may include providing an alert to the driver, sending an alert to dispatch, or activating emergency light bar 307 or siren. It may be desirable to take additional actions where the LEO's speed exceeds a third speed threshold. Non-limiting examples of such actions are discussed, below, and may include intervening into the vehicle's dynamics (e.g. to apply the brakes), limit the LEO's throttle demand, or alert the LEO to terminate a pursuit of a suspect vehicle. This tiered approach is consistent with the dichotomy discussed, above, where the interests of law enforcement conflict with the interests of public safety and the safety of the LEO. The tiered approach may reflect a law enforcement agency's judgment that the LEO should be provided discretion to respond to an emergency, while placing boundaries on that discretion to protect the public and the LEO.

Collisions and rollovers can also be detected with system 300 by sampling telemetry data from the accelerometer 303. During a collision the magnitude of the telemetry data from accelerometer 303 is much higher than the magnitude of the telemetry data from the accelerometer 303 discussed in connection with aggressive driving. For example, where the maximum longitudinal deceleration experienced by a vehicle may be approximately −1.3 Gs, a vehicle involved in a collision would experience much greater values of deceleration. For example, a vehicle stopping from a speed of 30 miles per hour in 1 foot would experience approximately −30 Gs. This type of rapid deceleration is indicative of a collision. Similarly, a vehicle's vertical acceleration (depicted as +/−Z values in FIG. 18) should be relatively low and only fluctuate as the vehicle experiences body roll or as the vehicle traverses uneven ground. The vehicle's vertical acceleration would increase sharply if the vehicle were involved in a rollover. In either case, the computer 312 may also be configured with software instructions to determine if there is a spike in acceleration above a predetermined threshold which is consistent with a collision or a rollover. The computer 312 may also be configured with instructions to trigger one or more actions in the event a collision or rollover is detected by the computer 312. A non-limiting example may include sending an emergency communication notifying dispatch of the collision or rollover. This could be beneficial, particularly where the LEO is not conscious, injured, or otherwise unable to request medical attention.

Still other driving behaviors may also be detected. As one example, it may be determined whether or not a driver of a given vehicle is maintaining a safe distance from a vehicle in front of him (put in other words, whether or not the driver is driving dangerously close to a vehicle in front of him). Similarly, it may be determined whether or not a driver of a given vehicle is maintaining a safe distance from a vehicle in to his side (put in other words, whether or not the driver is passing dangerously close to a vehicle on his side), e.g., a moving or parked vehicle. For the purposes of this disclosure, failure to maintain a safe distance is deemed an instance of aggressive or reckless driving. The determinations as to whether a safe distance is being maintained may be made based on captured image data of the two vehicles and/or data from sensors, such as GPS data (e.g., pertaining to the positions of the two vehicles), speed data, and acceleration data. The determinations may be made based on preassigned values of safe distances, which values have been inputted into the analytics engine for use in making the determinations. For example, a preassigned value of a safe distance between two vehicles may be 2 seconds (based on the speed of the vehicles) or a certain number of feet or vehicle lengths. One of ordinary skill in the art will understand how the analytics engine may make such determinations, in view of the description herein of other determinations made by the analytics engine.

Another driving behavior that may be detected is (repeated) hard braking of a vehicle. For the purposes of this disclosure, (repeated) hard braking of a vehicle is deemed an instance of aggressive or reckless driving. One of ordinary skill in the art will understand how the analytics engine may detect this behavior, e.g., based on acceleration (deceleration) and/or speed data in view of the description herein of other determinations made by the analytics engine. Another driving behavior that may be detected is improper crossing of a line marked on the roadway, e.g., crossing a double yellow line (which it is forbidden to cross), or repeated crossing of a white lane line (which is allowed, but repeated crossing of it may indicate aggressive, reckless, or intoxicated driving). For the purposes of this disclosure, improper crossing of a line marked on the roadway is deemed an instance of aggressive or reckless driving. One of ordinary skill in the art will understand how the analytics engine may detect this behavior, e.g., based on captured image data and/or sensor data, whether from a GPS device or other sensor, in view of the description herein of other determinations made by the analytics engine.

Having discussed the detection of the occurrence of various designated events, which the analytics engine is capable of performing, we turn to examples of various actions which may be triggered in response to such events. Once the analytics engine determines that one of the above-referenced events has occurred, the computer 312 may trigger one or more of the actions such as those discussed above. For example, but not by way of limitation, the triggered action may include:

(i) Providing an alert—The officer may be given a visual and/or audible alert on his vehicle display that the computer 312 has detected one or more of the above-referenced events (e.g. speeding, failing to stop at a stop sign or red light, a collision or near collision, aggressive acceleration, deceleration or swerving, or other aggressive/erratic maneuvers).

(ii) Bookmarking—Computer 312 may mark the occurrence of one or more of the above-described detected events in the metadata for the captured image data (or telemetry data) and/or separate data file which corresponds to the captured image data (or telemetry data). These bookmarks act as a timestamp on events of interest to facilitate a user to quickly access the captured images and other telemetry pertaining to an event of interest.

(iii) Activating emergency lights—The computer 312 may be configured with instructions to activate the emergency light bar and/or siren.

(iv) Intervening in driving dynamics—The computer 312 may be configured with instructions to intervene into the driver's own control of the vehicle, such as applying brake pressure to one or more wheels, overriding or limiting the driver's demand for throttle, reducing ignition or fuel, and/or limiting boost pressure in the case of a forced induction engine.

(v) Displaying an image—A video or still image which is representative of the event (e.g. the neglected stop or speed signage, the near collision, etc.) may be displayed on the vehicle display. A snapshot can be displayed, highlighting or putting a bounding box around the neglected stop or speed signage, the object which the vehicle nearly collided with, etc.

(vi) Activating data recording—An onboard storage device may start saving the information being captured by the vehicle's camera device. Other camera devices in the vehicle can be triggered to start recording. The captured information may also be transmitted concurrently via the communication network to be stored at the police station or another location.

(vii) Communicating information relating to the detected event to another location/user—The telemetry may be transmitted via the communication network to the police station or other locations (e.g., other police officers in the area). Information such as the driver's detected driving behavior, location (latitude/longitude), direction of travel, speed and time can be transmitted to police dispatch or other remote location. For example, associated metadata and/or a snapshot can be transmitted to a remote location or to any or all other computer devices or members/users in the group or to a dispatch/command center. For example, this would provide data to the remote individual (e.g. dispatch/command center) that the system had detected certain driving behavior and the individual could contact the officer to determine the reason for the officer's driving behavior.

(viii) Training the driver—When the above-referenced driving behavior is detected, the telemetry could be compiled with the synchronized audio and video associated with the event and presented to the driver in a user interface featuring corrective training. Additionally, the user interface could include a history of driving events for each officer.

With reference again to FIG. 14, it is noted that system 300 can detect not only events pertaining to vehicle 310 (such as described above), but also such events pertaining to other vehicles. System 300 may use the above-described components of system 300 (i.e. sensors, computer 312, etc. of vehicle 310) to detect these events pertaining to other vehicles; the events pertaining to other vehicles may be detected by system 300 without requiring use of such components (sensors, etc.) disposed on the other vehicles. As a non-limiting example, system 300 can monitor various driving events of other drivers. For example, as illustrated in FIG. 17, depicts a system 300 can detect when another vehicle 350 (which will be referred to as a second vehicle) fails to stop at a traffic light 341 (or at stop sign 331, FIG. 16). For example, but not by way of limitation, the analytics engine can recognize the traffic light 341 in image data captured by camera device 316. As the second vehicle 350 approaches the traffic light 341, the traffic light 341 becomes larger relative to the size of the video frame 320 of camera 316. If the second vehicle 350 slows and stops at the traffic light 341, the size of the second vehicle 350 should increase at the same proportion to the traffic light 341. If the size of the second vehicle 350 does not, then that is indicative of the second vehicle 350 failing to stop at the traffic light 341. As another non-limiting example, a video camera (e.g., 316, FIG. 14) in a stationary vehicle (e.g., 310) may monitor an intersection, capturing video of the vehicles going through the intersection. The video camera may employ a virtual line, corresponding to a line marked on the roadway. The roadway line would demarcate the beginning of an intersection, crosswalk, etc. at a stop sign or traffic light. Using the virtual line and the image of the vehicle 350 in the display, the video camera may determine whether or not the vehicle 350 comes to a complete stop before passing the line, i.e., before passing the stop sign or traffic light. Using such techniques, system 300 can determine if the second vehicle 350 has failed to stop at a traffic light or a stop sign.

In another non-limiting example, the computer 312 of system 300 can also detect whether the second vehicle 350 is speeding. Using methods similar to those discussed, above, the analytics engine can determine the relative speed of the second vehicle 350 to the first vehicle 310 (i.e. the speed of the second vehicle 350 relative to the speed of the first vehicle 310). For example, the analytics engine can recognize the second vehicle 350 in the captured image data from video frame 320. The image data can be sampled at a known rate. The computer 312 can calculate the change in size of the known objects relative to the entire video frame as discussed above. In other words, the rate at which the second vehicle 350 appears to increase (or decrease) can be used to calculate the relative speed of the vehicle 310 to the second vehicle 350. Also, using the methods discussed, above, system 300 can sample the telemetry from the speed sensor 304. Adding the speed of the first vehicle 310 to the relative speed of the second vehicle 350 would yield the speed of the second vehicle 350. Computer 312 may also determine the speed of second vehicle 350, and hence determine if vehicle 350 is speeding, in other ways. For example, video data of the second vehicle 350 could be captured continually for a period of time. As the video progresses frame by frame, the second vehicle 350 appearing in the video display moves across the display. The distance the second vehicle 350 moves across the display from an initially measured/recorded position in a given frame to a subsequently measured/recorded position in a given subsequent frame can be measured. These positions and this distance in the display can be correlated with actual physical positions and distance. In addition, the frame rate of the video (e.g., 30 frames per second) is known. Accordingly, it may be determined how far the second vehicle 350 moves in a given period of time. From this, the speed of second vehicle 350 can be determined. As described here, the computer 312 can thus in various ways determine the speed of second vehicle 350 without use of sensors (speed sensor, accelerometer, GPS device, etc.). Computer 312 may use multiple different methods to determine the speed of second vehicle 350, for example, one or more methods may be used to corroborate results obtained another one or more methods. System 300 could store the speed of the second vehicle 350 as a separate file in internal memory 313 or store the telemetry data as metadata with the video data of the image data captured from the camera device 316. This method could be useful to law enforcement agencies for detecting speeding without emitting electromagnetic radiation or light, which are detectable with radar or laser detectors.

According to another embodiment, a vehicle may be provided with a display (e.g., a dash cam) configured to display detected events. In some cases, the events displayed may be events of the vehicle itself, e.g., the display of vehicle 310 displays the fact that vehicle 310 is speeding. In some cases, the events displayed may be events of another vehicle, e.g., the display of vehicle 310 displays the fact that vehicle 350 is speeding. In some cases, the events displayed may be events of the vehicle itself and events of another vehicle. When an event of a given vehicle (e.g., the vehicle is speeding) is detected, the device (e.g., computer 312) detecting the event may send a notification of the detected event to a remote (e.g., cloud-based) server. Upon receipt of the notification, the server may send out a corresponding notification of the detected event to others (e.g., vehicles/drivers) to alert them of the detected event that occurred with the given vehicle. Notifications may be sent to others within a designated radius (distance) of the detected event or within a designated radius (distance) of the vehicle with respect to which the event was detected. This arrangement could be used to alert the police, other citizens/drivers, or even pedestrians nearby (e.g., by flashing the alert on a road sign). These notifications could serve, e.g., to alert the police and innocent citizens of a danger such as a reckless driver in the vicinity. Citizens would then be better able to protect themselves from such dangers (such as being hit by the reckless driver), by being on guard when driving or walking near, or crossing, a road in the vicinity of the vehicle in question. As for the content of the notification, it may include identification of the vehicle with respect to which the event was detected (e.g., the speeding vehicle), such as license plate information, vehicle make/model/color/year, etc., and identification of the nature of the event (e.g., reckless driving, speeding, going through a red light, etc.) and the location of the event (e.g., street address, distance from the recipient of the notification, etc.). The notification may also include still images or video clips of the vehicle (or another vehicle of the same make/model/color/year, etc.) and/or the detected event. This content may be displayed, as appropriate, as text (displayed and/or audible) and/or image/video, on the display of the vehicle receiving the notification. Citizens or drivers may register with a service or with the police in order to participate, that is, either to have their vehicles be monitored for events and/or to receive notifications of detected events of other vehicles. In some embodiments, self-driving vehicles would participate as monitored vehicles and/or notification recipients. In a network of self-driving vehicles, all the self-driving vehicles may be monitored and receive notifications (at least from other self-driving vehicles in the network). The travel vectors or trajectories of the self-driving vehicles may be known/obtained by a service, and the service may send notifications to recipient parties projected to be soon in the vicinity of the vehicle with respect to which an event was detected. Also, the notifications may include (in addition to content noted above) the travel vector/trajectory of the vehicle with respect to which an event was detected.

Figure 19:
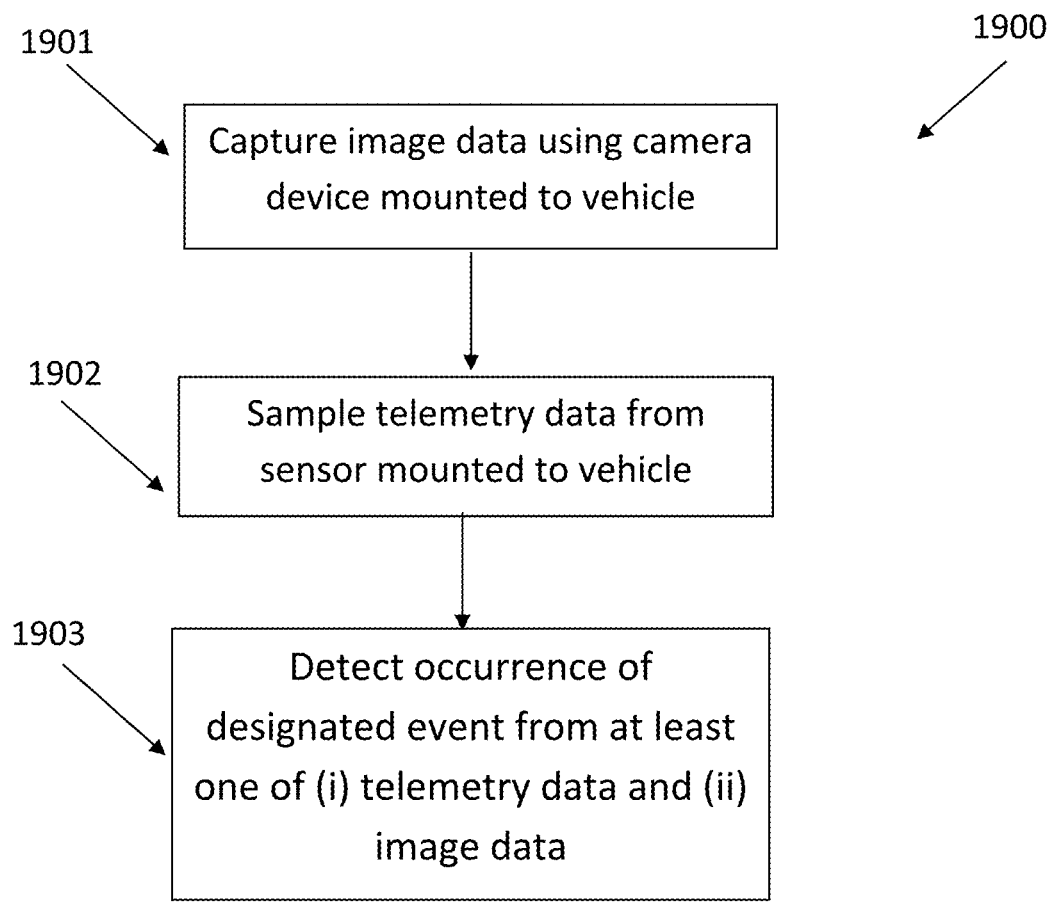
FIG. 19, in accordance with some embodiments of the present disclosure, is a flow chart of a method of detecting events based on the capture of image and telemetry data.

FIG. 19 is a flow chart illustrating a method according to one or more embodiments described in greater detail above. According to illustrated method 1900, at block 1901 image data is captured using a camera device mounted to a vehicle. At block 1902, telemetry data is sampled from at least one sensor mounted to the vehicle. At block 1903, the occurrence of at least one designated event is detected from at least one of (i) the telemetry data and (ii) the image data.

Figure 20:
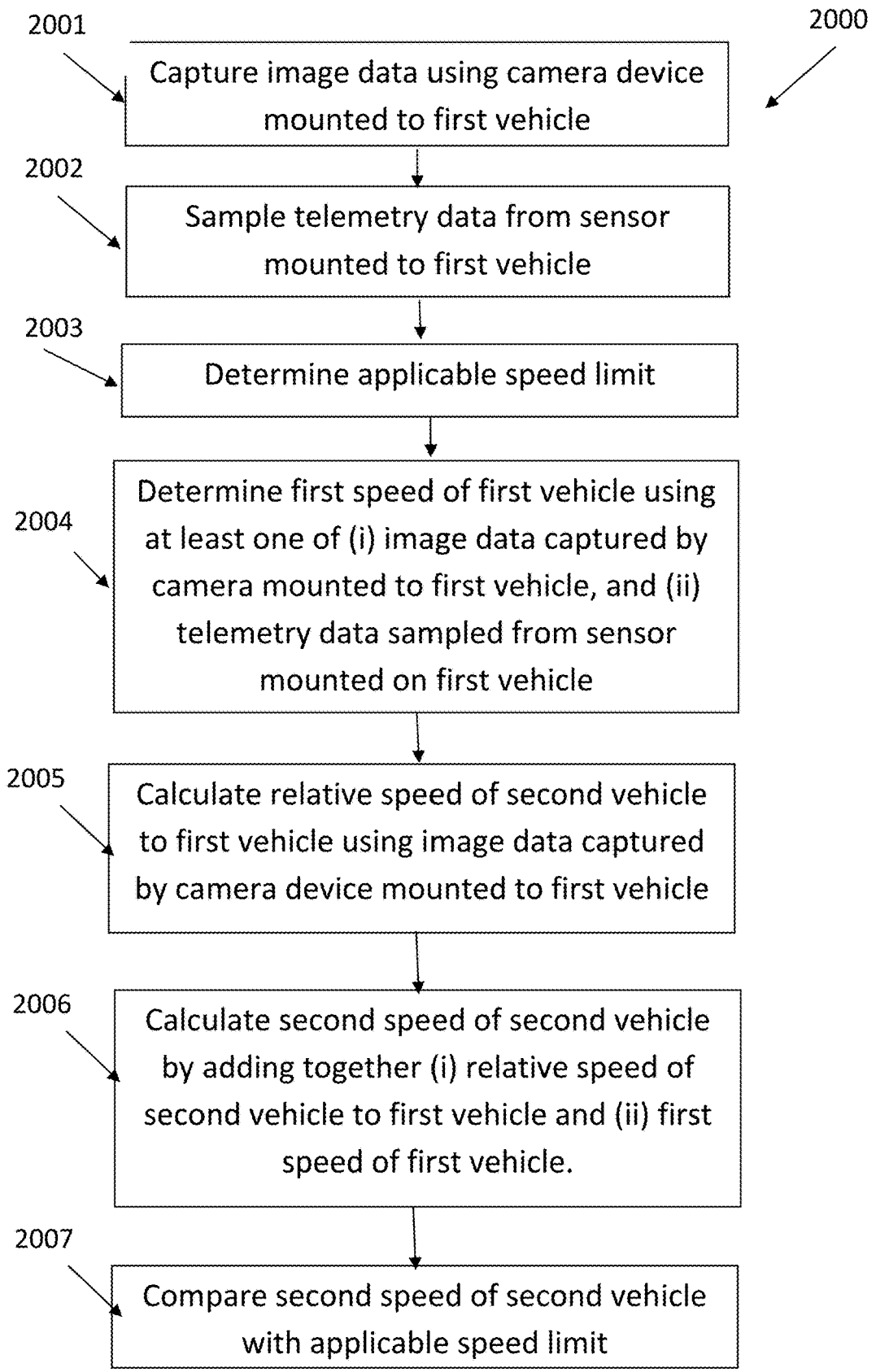
FIG. 20, in accordance with some embodiments of the present disclosure, is a flow chart of a method of determining the speed of a second vehicle based on image data and telemetry data captured by a first vehicle.

FIG. 20 is a flow chart illustrating a method according to one or more embodiments described in greater detail above. According to illustrated method 2000, at block 2001 image data is captured using a camera device mounted to a first vehicle. At block 2002, telemetry data is sampled from at least one sensor mounted to the first vehicle. At block 2003, an applicable speed limit is determined. At block 2004, a first speed of the first vehicle is determined using at least one of (i) the image data captured by the camera mounted to the first vehicle, and (ii) the telemetry data sampled from the at least one sensor mounted on the first vehicle. At block 2005, a relative speed of a second vehicle to the first vehicle is calculated using the image data captured by the camera device mounted to the first vehicle. At block 2006, a second speed of the second vehicle is calculated by adding together (i) the relative speed of the second vehicle to the first vehicle and (ii) the first speed of the first vehicle. At block 2007, the second speed of the second vehicle is compared with the applicable speed limit.

With regard to the various determinations that computer 312 or the analytics engine may make, it will be understood that in some cases more than one method may be used to determine a given piece of data (e.g., speed, acceleration, etc.) for purposes to of corroboration, verification, validation, triangulation (i.e., cross-checking multiple data sources and collection procedures to evaluate the extent to which all evidence converges), etc.

In light of the principles and example embodiments described and depicted herein, it will be recognized that the example embodiments can be modified in arrangement and detail without departing from such principles. Also, the foregoing discussion has focused on particular embodiments, but other configurations are also contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, and processes in which the individual operations disclosed herein are combined, subdivided, rearranged, or otherwise altered. This disclosure describes one or more embodiments wherein various operations are performed by certain systems, applications, modules, components, etc. In alternative embodiments, however, those operations could be performed by different components. Also, items such as applications, modules, components, etc., may be implemented as software constructs stored in a machine accessible storage medium, such as an optical disk, a hard disk drive, etc., and those constructs may take the form of applications, programs, subroutines, instructions, objects, methods, classes, or any other suitable form of control logic; such items may also be implemented as firmware or hardware, or as any combination of software, firmware and hardware, or any combination of any two of software, firmware and hardware.

This disclosure may include descriptions of various benefits and advantages that may be provided by various embodiments. One, some, all, or different benefits or advantages may be provided by different embodiments.

In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

What is claimed is:

1. A system structured for use in association with a vehicle, the system comprising:
   at least one camera device configured to capture image data;
   at least one microphone configured to capture voice data;
   a sensor system comprising:
      at least one sensor configured to capture vehicle telemetry data;
      a global positioning system (GPS) device to capture current location data; and
      a speed sensor or an accelerometer; and
   a microprocessor communicatively coupled to the at least one camera device and the sensor system, wherein the microprocessor is configured with instructions to cause the microprocessor to:
      receive information regarding analysis of captured image data and captured vehicle telemetry data;
      detect an occurrence of at least one designated event based on the analysis;
      obtain the current location data from the sensor system;
      determine that the at least one camera device is within a proximity threshold with respect to the current location data and a location of capture of the image data causing the at least one designated event; and
      trigger one or more actions based on the determination, the one or more actions including:
         initiating transmission of a live stream of image data from the at least one camera device to at least one other device located in a second vehicle or located at a facility, wherein the live stream transmission is observable with the other device by at least one user located in the second vehicle or located at the facility,
         capturing voice data with the microphone, and
         creating a text file representation of the captured voice data.

2. The system of claim 1, wherein the at least one designated event comprises at least one of (i) a speed or acceleration of the vehicle is outside of a threshold, (ii) failure to stop at a traffic light, (iii) failure to stop at a stop sign, (iv) a collision, (v) a near collision, (vi) reckless driving, and (vii) rollover of the vehicle.

3. The system of claim 1, wherein the instructions to cause the microprocessor to trigger one or more actions further comprise instructions to cause the microprocessor to initiate an action to:
   record image data captured by the at least one camera device to internal memory; and
   bookmark the at least one designated event in metadata associated with the image data captured by the at least one camera device.

4. The system of claim 1, wherein triggering the one or more actions comprises initiating an action to intervene into driving dynamics of the vehicle.

5. The system of claim 3, wherein the instructions to cause the microprocessor to bookmark include instructions to cause the microprocessor to create a timestamp index in an image data recording associated with particular image data selected from the captured image data, the particular image data pertaining to the designated event.

6. The system of claim 1, wherein triggering the one or more actions comprises initiating an action to activate data recording by the at least one camera device or another device.

7. The system of claim 6, wherein the activating data recording by the at least one camera device or another device comprises at least one of:
   (i) activating one or more camera devices located external to the vehicle and within a set range of a location of the occurrence of at least one designated event, or
   (ii) causing one or more devices, located external to the vehicle and within a set range of a location of the occurrence of at least one designated event, to start analyzing captured image data.

8. The system of claim 1, wherein triggering the one or more actions comprises performing a keyword search of the text file representative of the captured voice data.

9. The system of claim 1, wherein triggering the one or more actions comprises initiating an action to display an image pertaining to the at least one designated event on a display in the vehicle.

10. The system of claim 1, wherein the system further comprises:
    a receiver communicatively coupled to the microprocessor and operable to receive communications via a communications network, wherein the microprocessor is operable to receive communications via the receiver;
    a memory communicatively coupled to the microprocessor and operable to store data, wherein the microprocessor is operable to store data in the memory; and
    a communication connection to a remote server communicatively coupled to the at least one camera device via a communications network and operable to receive image data captured by the at least one camera device.

11. The system of claim 1, wherein the transmission of the live stream of the image data comprises transmission of current image data to a device external to the vehicle as new image data is being captured.

12. The system of claim 1, wherein the analysis of captured image data and captured vehicle telemetry data comprises defining a bounding box in a video frame of the captured image data and comparing dimensions of the bounding box over time, the bounding box representing an object or person external to the vehicle.

13. A method, comprising:
    capturing image data using a camera device, wherein the camera device is mounted to a vehicle;
    sampling telemetry data from at least one sensor of a sensor system, wherein the at least one sensor is mounted to the vehicle and comprises a speed sensor or an accelerometer;
    obtaining current location data of the vehicle from a global positioning system (GPS) of the sensor system;
    detecting an occurrence of at least one designated event from at least one of (i) the sampled telemetry data and (ii) the captured image data, based on analysis of at least one of the captured image data and the sampled telemetry data;
    determining that the at least one camera device is within a proximity threshold with respect to the current location data and a location of capture of the image data causing the at least one designated event; and
    triggering one or more actions based on the determining, the one or more actions including initiating transmission of a live stream of captured image data from the at least one camera device to at least one other device located in a second vehicle or located at a facility, wherein the live stream transmission is observable with the other device by at least one user located in the second vehicle or located at the facility, capturing voice data with at least one microphone, and creating a text file representation of the captured voice data.

14. The method of claim 13, wherein the at least one designated event comprises at least one of (i) a speed or acceleration of the vehicle is outside of a threshold, (ii) failure to stop at a traffic light, (iii) failure to stop at a stop sign, (iv) a collision, (v) a near collision, (vi) reckless driving, and (vii) rollover of the vehicle.

15. The method of claim 13, wherein triggering the one or more actions comprises initiating an action to cause:
recording the image data captured by the camera device to internal memory; and
bookmarking the at least one designated event in metadata associated with the image data captured by the camera device.

16. The method of claim 13, wherein triggering the one or more actions comprises initiating an action to intervene into driving dynamics of the vehicle.

17. The method of claim 13, wherein triggering the one or more actions comprises initiating an action to activate data recording by the camera device or another device.

18. The method of claim 17, wherein the initiating an action to activate data recording by the camera device or another device comprises at least one of:
(i) activating one or more camera devices located external to the vehicle and within a set range of a location of the occurrence of at least one designated event, or
(ii) causing one or more devices, located external to the vehicle and within a set range of a location of the occurrence of at least one designated event, to start analyzing captured image data.

19. The method of claim 13, wherein triggering the one or more actions comprises initiating an action to perform a keyword search of the text file representative of the captured voice data.

20. The method of claim 13, wherein triggering the one or more actions comprises initiating an action to display an image pertaining to the at least one designated event on a display in the vehicle.

21. The method of claim 13, further comprising:
using a receiver, receiving communications via a communications network; and
transmitting at least one of:
(i) image data captured by the camera device, or
(ii) telemetry data sampled from the at least one sensor;
wherein the transmitting is to at least one of (i) a local memory or (ii) remote storage.

* * * * *